US012688361B2

(12) United States Patent
Townsend-Last et al.

(10) Patent No.: US 12,688,361 B2
(45) Date of Patent: Jul. 21, 2026

(54) MACHINE LEARNING BASED QUESTION AND ANSWER (Q and A) ASSISTANT

(71) Applicant: Notion Labs, Inc., San Francisco, CA (US)

(72) Inventors: Simon Townsend-Last, New York, NY (US); Abhishek Kishore Modi, San Francisco, CA (US); Jacob Matthew Sager, San Francisco, CA (US); Phanara Darin Im, San Francisco, CA (US); Kenny Kin Fai Leung, San Francisco, CA (US); Shir Judith Yehoshua, San Francisco, CA (US)

(73) Assignee: Notion Labs, Inc., San Francisco, CA (US)

( * ) Notice: Subject to any disclaimer, the term of this patent is extended or adjusted under 35 U.S.C. 154(b) by 50 days.

(21) Appl. No.: 18/634,357

(22) Filed: Apr. 12, 2024

(65) Prior Publication Data

US 2025/0322158 A1     Oct. 16, 2025

(51) Int. Cl.
*G06F 16/33*          (2025.01)
*G06F 16/3329*      (2025.01)
*G06F 40/284*      (2020.01)
*G06F 40/30*        (2020.01)

(52) U.S. Cl.
CPC ........ *G06F 40/284* (2020.01); *G06F 16/3329* (2019.01)

(58) Field of Classification Search
CPC ............................ G06F 40/284; G06F 16/242
See application file for complete search history.

(56) References Cited

U.S. PATENT DOCUMENTS

| | | | |
|---|---|---|---|
| 11,868,706 B1 * | 1/2024 | Lu | G06F 40/117 |
| 2019/0243910 A1 | 8/2019 | Wang et al. | |
| 2021/0173829 A1 * | 6/2021 | Zeng | G06F 16/24524 |
| 2024/0086452 A1 | 3/2024 | Agley et al. | |

(Continued)

OTHER PUBLICATIONS

Jake Teton-Landis, "The data model behind Notion's flexibility", [online], https://www.notion.com/blog/data-model-behind-notion, published May 18, 2021. (Year: 2021).*

(Continued)

*Primary Examiner* — Jialong He
(74) *Attorney, Agent, or Firm* — Perkins Coie LLP; Alberto Araiza; Anni Siitonen

(57) ABSTRACT

A multimodal content management system having a block-based data structure can include a question and answer (Q&A) assistant engine. The Q&A assistant engine can capture a natural language prompt, which can be tokenized to generate a set of data source tokens and a set of parameter tokens. A parameter token in the set of parameter tokens can be indicative of a block property in the block-based data structure. A trained neural network can accept the data source tokens and/or parameter tokens as inputs to generate a query executable against the block-based data structure. The query can generate a result set, which can be visualized concurrently with the input control of the Q&A assistant engine. The input control can accept subsequent natural language prompts while maintaining result set visualizations. Items in result set visualizations generated in response to a particular prompt can include content in different modalities.

20 Claims, 14 Drawing Sheets

(56) References Cited

U.S. PATENT DOCUMENTS

2025/0217428 A1  7/2025  Pedersen et al.

OTHER PUBLICATIONS

Kharma Medic, Notion AI tutorial, [online], https://www.youtube.com/watch?v=sBKYPri_-vU; (Year: 2023).*
Anonymous, "Just Ask Notion AI", [online] www.notion.com, retrieved from "archive.org". Archived on Jan. 26, 2024. (Year: 2024).*
ISA, International Search Report for International Application No. PCT/US24/36534, mailed on Nov. 21, 2024, 5 pages.
Andersson "Retrieval-Augmented Generation with Azure Open AI" Malardalen University School of Innovation Design and Engineering; Vasteras, Sweden, Jun. 2024, 24 pgs.
Jun et al. "A question-and-answer system based on artificial intelligence" ICIT 2024, Kuala Lumpur, Malaysia, Dec. 2024, pp. 299-305.

* cited by examiner

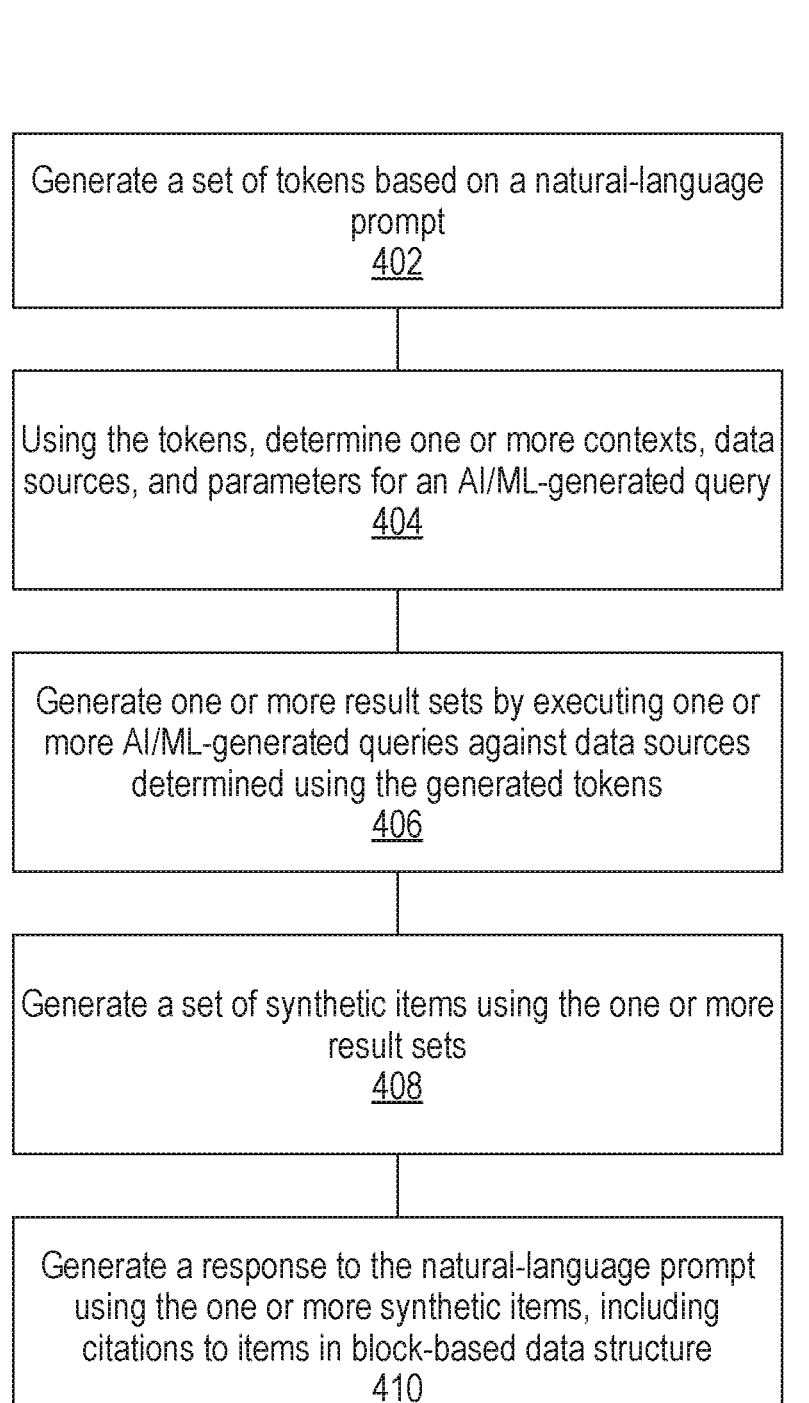

400

Generate a set of tokens based on a natural-language prompt
402

Using the tokens, determine one or more contexts, data sources, and parameters for an AI/ML-generated query
404

Generate one or more result sets by executing one or more AI/ML-generated queries against data sources determined using the generated tokens
406

Generate a set of synthetic items using the one or more result sets
408

Generate a response to the natural-language prompt using the one or more synthetic items, including citations to items in block-based data structure
410

*FIG. 4A*

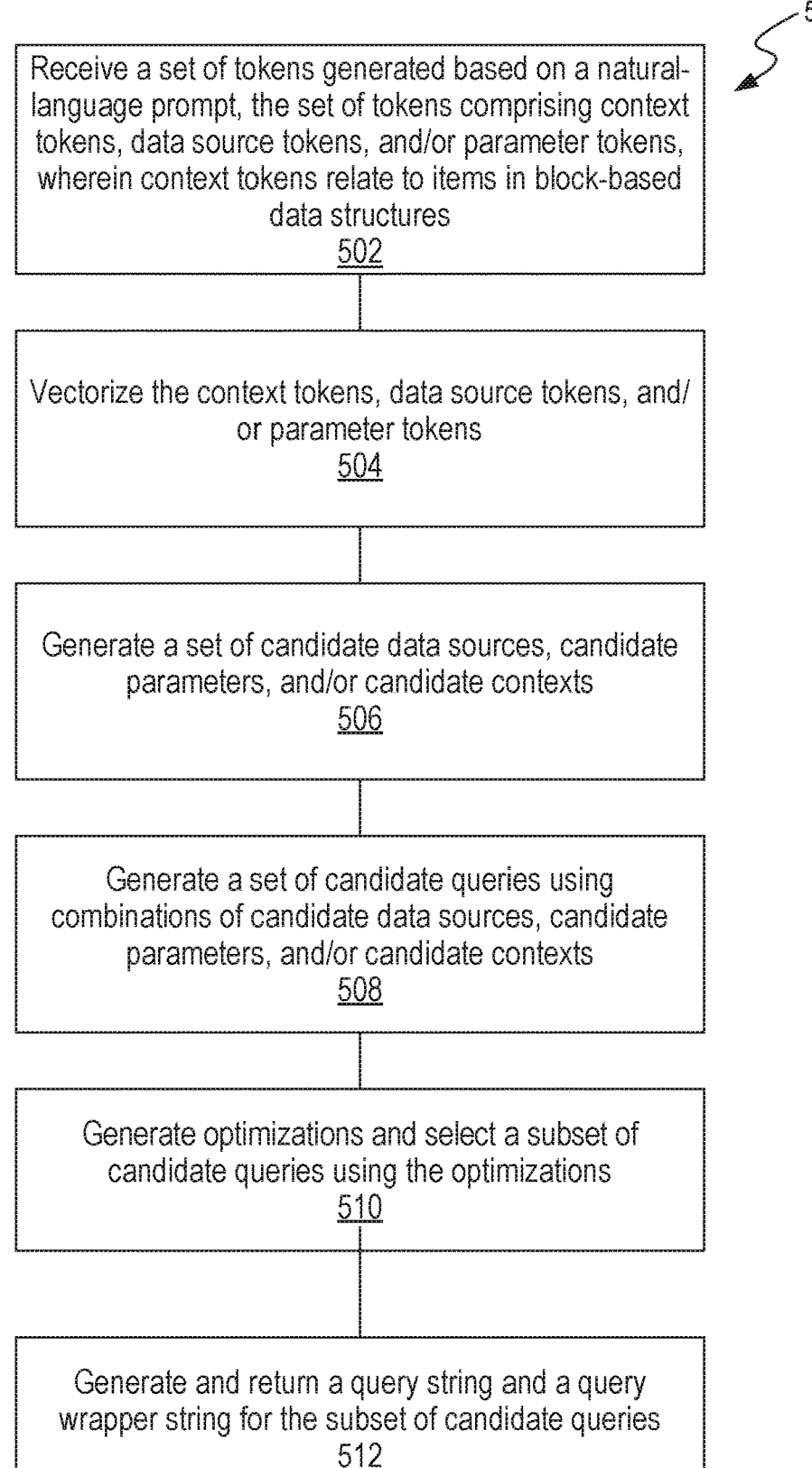

Receive a set of tokens generated based on a natural-language prompt, the set of tokens comprising context tokens, data source tokens, and/or parameter tokens, wherein context tokens relate to items in block-based data structures
502

Vectorize the context tokens, data source tokens, and/or parameter tokens
504

Generate a set of candidate data sources, candidate parameters, and/or candidate contexts
506

Generate a set of candidate queries using combinations of candidate data sources, candidate parameters, and/or candidate contexts
508

Generate optimizations and select a subset of candidate queries using the optimizations
510

Generate and return a query string and a query wrapper string for the subset of candidate queries
512

Receive an indication of an AI/ML model to train
602

In response to receiving a prompt, automatically generate a question, keywords, and a set of responses
604

Generate navigable citations to blocks associated with responses
606

Associate user-specified labels with responses in the set of responses
608

Generate model optimizations based on the user-specified labels
610

800

MACHINE LEARNING BASED QUESTION AND ANSWER (Q and A) ASSISTANT

BACKGROUND

Project management systems enable teams to organize work and can be used in workflow automation, task management, project planning, and file sharing. Some project management systems can be augmented via document management systems, which are designed to manage, track, and store documents, aiming to reduce the use and dependency on physical paper. A document management system can serve as a central repository, making it easy for organizations to organize data. Individuals typically search document management systems by entering keywords into a search bar.

Many industries are turning to artificial intelligence tools to automate tasks that previously required significant human labor or were infeasible or impossible for humans to perform. However, despite advancement of these tools, integrating them into some types of environments, such as project management systems and/or document management systems, has proven challenging. Existing tools, for example, lack the inherent capacity to autonomously comprehend and navigate structured software environments without extensive manual guidance. These limitations hamper the ability of artificial intelligence tools to perform tasks seamlessly and efficiently within these environments.

BRIEF DESCRIPTION OF THE DRAWINGS

Reference will now be made, by way of example, to the accompanying drawings which show example embodiments of the present application, and in which:

FIG. 4A is a flowchart showing an example method of operation of an AI/ML based question and answer (Q&A) assistant, according to some arrangements.

FIG. 5A is a flowchart showing an example method of operation of an AI/ML based query generator for the Q&A assistant, according to some arrangements.

FIGS. 5B-1 and 5B-2 are example queries generated by the AI/ML based query generator of the Q&A assistant, according to some arrangements.

Figure 1:
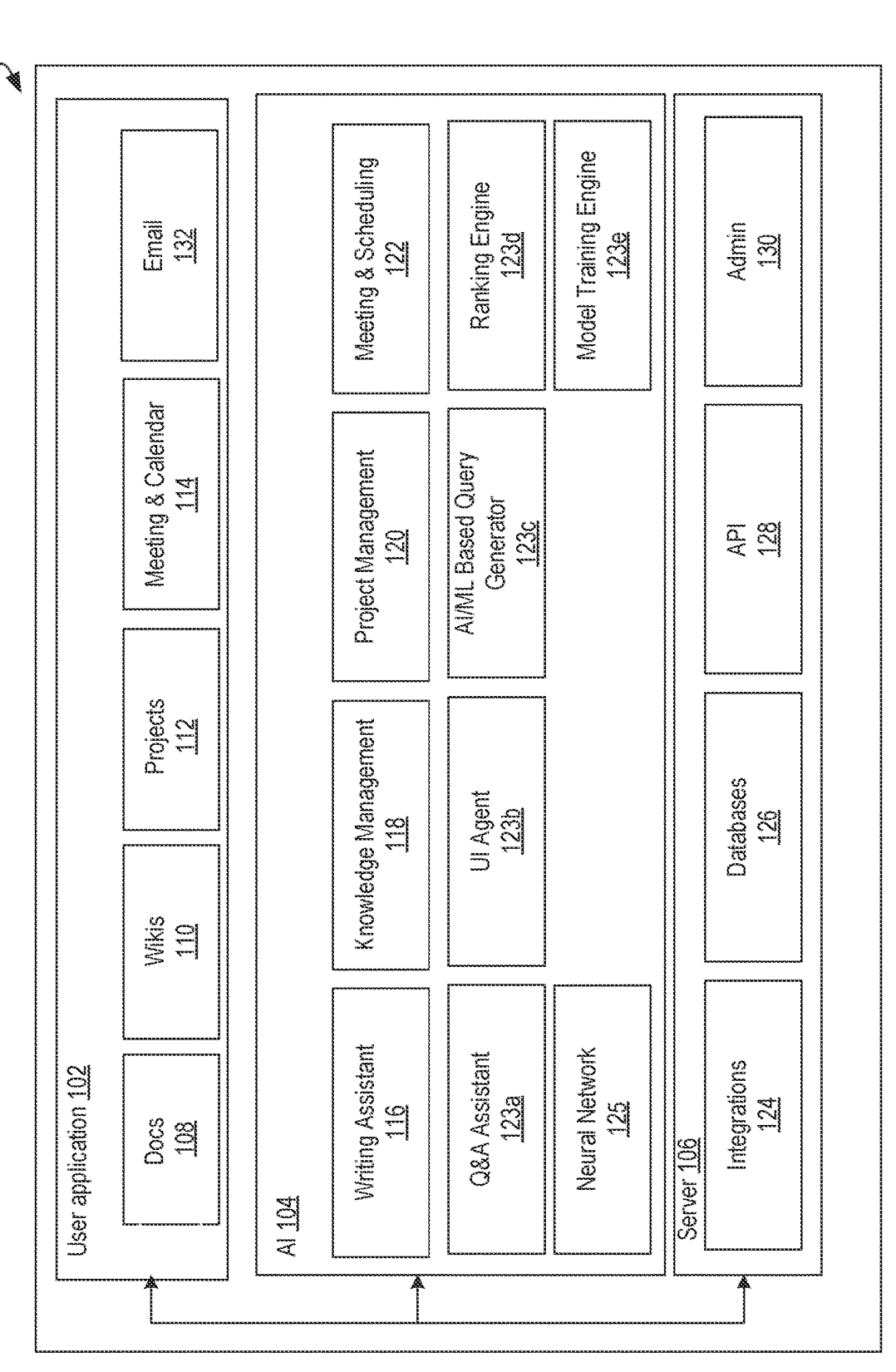
FIG. 1 is a block diagram illustrating a platform, which may be used to implement examples of the present disclosure.

The technologies described herein will become more apparent to those skilled in the art by studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The technology disclosed herein includes improved systems, methods, and computer-readable media for storage of linked multimodal content (for example, in a block-based data structure, such as the data structures described herein). Multimodal content refers to content items of different types (e.g., text, images, video, audio, multimedia), where the items can be related. For example, a particular conceptual unit of multimodal content can include a project plan, meeting notes, to-do lists, project budgets, stakeholder interview recordings (e.g., in audio and/or video form), and user-interactive multimedia training files. Items in a particular unit of multimodal content can have a variety of provenances. For example, the items can include imported items, human-generated items, machine-learning (ML) generated items, and/or artificial-intelligence (AI) generated items. Multimodal content is typically difficult to organize and search, in a unified manner, by using a single search instruction across modalities. Furthermore, units of multimodal content may not be natively suitable for AI-based analytics. Some implementations of the disclosed technology include improved systems, methods, and computer-readable media for optimization of multimodal content for AI-based analytical operations.

For example, the disclosed technology includes improved systems, methods, and computer-readable media for enabling Q&A assistant operations, including Q&A assistant operations for multimodal data stored in block-based data structures described herein. For example, in response to a prompt, more than one AI-generated query can be executed to generate result sets that include content in different modalities. The result sets can be consolidated in post-processing such that a response includes items or links to items in multiple modalities. For instance, a particular response can include a set of citations to pages that include responsive blocks of text, images, audio, video, multimedia files, and so forth.

The Q&A assistant can be optimized to automatically search the block-based data structures described herein to identify, retrieve, analyze, and synthesize information. Configuring the Q&A assistant to automatically search block-based data structures, as described herein, improves training capabilities of AI models (e.g., neural networks) that underlie the Q&A assistant. For example, the Q&A assistant can be trained on block properties rather than, or in addition to, being trained on block content, which can improve predictive capabilities of the neural networks while maintaining data privacy. Furthermore, the block properties can function as built-in data labels, which can significantly simplify the process of generating training data. Furthermore, the block properties can include previously-generated properties (e.g., AI-generated summaries), which can be scrubbed to remove confidential information but retain a level of responsiveness to anticipated queries.

The Q&A assistant can also include automatic generative AI capabilities that enable the Q&A assistant to augment the generated responses. For example, the Q&A assistant can generate responses, including synthetic items and/or calculations, based on items in a particular teamspace or workspace to which a user has access permissions, and then include the responses in AI-generated narratives.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Block Data Model

The disclosed technology includes a block data model ("block model"). For example, the Q&A assistant described herein can automatically analyze and retrieve items (e.g., Rich Text Files (RTF), data, tables, images, audio, multimedia) that are stored and managed using blocks. The blocks are dynamic units of information that can be transformed into other block types and move across workspaces. The block model allows users to customize how their information is moved, organized, and shared. Hence, blocks contain information but are not siloed.

Blocks are singular pieces that represent all units of information inside an editor. In one example, text, images, lists, a row in a database, etc., are all blocks in a workspace. The attributes of a block determine how that information is rendered and organized. Every block can have attributes including an identifier (ID), properties, and type. Each block is uniquely identifiable by its ID. The properties can include a data structure containing custom attributes about a specific block. An example of a property is "title," which stores text content of block types such as paragraphs, lists, and the title of a page. More elaborate block types require additional or different properties, such as a page block in a database with user-defined properties. Every block can have a type, which defines how a block is displayed and how the block's properties are interpreted.

A block has attributes that define its relationship with other blocks. For example, the attribute "content" is an array (or ordered set) of block IDs representing the content inside a block, such as nested bullet items in a bulleted list or the text inside a toggle. The attribute "parent" is the block ID of a block's parent, which can be used for permissions. Blocks can be combined with other blocks to track progress and hold all project information in one place.

A block type specifies how the block is rendered in a user interface (UI), and the block's properties and content are interpreted differently depending on that type. Changing the type of a block does not change the block's properties or content—it only changes the type attribute. The information is thus rendered differently or even ignored if the property is not used by that block type. Decoupling property storage from block type allows for efficient transformation and changes to rendering logic and is useful for collaboration.

Blocks can be nested inside of other blocks (e.g., infinitely nested sub-pages inside of pages). The content attribute of a block stores the array of block IDs (or pointers) referencing those nested blocks. Each block defines the position and order in which its content blocks are rendered. This hierarchical relationship between blocks and their render children are referred to herein as a "render tree." In one example, page blocks display their content in a new page, instead of rendering it indented in the current page. To see this content, a user would need to click into the new page.

In the block model, indentation is structural (e.g., reflects the structure of the render tree). In other words, when a user indents something, the user is manipulating relationships between blocks and their content, not just adding a style. For example, pressing Indent in a content block can add that block to the content of the nearest sibling block in the content tree.

Blocks can inherit permissions of blocks in which they are located (which are above them in the tree). Consider a page: to read its contents, a user must be able to read the blocks within that page. However, there are two reasons one cannot use the content array to build the permissions system. First, blocks are allowed to be referenced by multiple content arrays to simplify collaboration and a concurrency model. But because a block can be referenced in multiple places, it is ambiguous which block it would inherit permissions from. The second reason is mechanical. To implement permission checks for a block, one needs to look up the tree, getting that block's ancestors all the way up to the root of the tree (which is the workspace). Trying to find this ancestor path by searching through all blocks' content arrays is inefficient, especially on the client. Instead, the model uses an "upward pointer"—the parent attribute—for the permission system. The upward parent pointers and the downward content pointers mirror each other.

A block's life starts on the client. When a user takes an action in the interface—typing in the editor, dragging blocks around a page—these changes are expressed as operations that create or update a single record. The "records" refer to persisted data, such as blocks, users, workspaces, etc. Because many actions usually change more than one record, operations are batched into transactions that are committed (or rejected) by the server as a group.

Creating and updating blocks can be performed by, for example, pressing Enter on a keyboard. First, the client defines all the initial attributes of the block, generating a new unique ID, setting the appropriate block type (to_do), and filling in the block's properties (an empty title, and checked: [["No"]]). The client builds operations to represent the creation of a new block with those attributes. New blocks are not created in isolation: blocks or pointers thereto are also added to their parent's content array, so they are in the correct position in the content tree. As such, the client also generates an operation to do so. All these individual change operations are grouped into a transaction. Then, the client applies the operations in the transaction to its local state. New block objects are created in memory and existing blocks are modified. In native apps, the model caches all records that are accessed locally in an LRU (least recently used) cache on top of SQLite or IndexedDB, referred to as RecordCache. When records are changed on a native app, the model also updates the local copies in RecordCache. The editor re-renders to draw the newly created block onto the display. At the same time, the transaction is saved into TransactionQueue, the part of the client responsible for sending all transactions to the model's servers so that the data is persisted and shared with collaborators. Transaction- Queue stores transactions safely in IndexedDB or SQLite (depending on the platform) until they are persisted by the server or rejected.

A block can be saved on a server to be shared with others. Usually, TransactionQueue sits empty, so the transaction to create the block is sent to the server in an application programming interface (API) request. In one example, the transaction data is serialized to JSON and posted to the/saveTransactions API endpoint. SaveTransactions gets the data into source-of-truth databases, which store all block data as well as other kinds of persisted records. Once the request reaches the API server, all the blocks and parents involved in the transaction are loaded. This gives a "before" picture in memory. The block model duplicates the "before" data that had just been loaded in memory. Next, the block model applies the operations in the transaction to the new copy to create the "after" data. Then the model uses both "before" and "after" data to validate the changes for permissions and data coherency. If everything checks out, all created or changed records are committed to the database—meaning the block has now officially been created. At this point, a "success" HTTP response to the original API request is sent by the client. This confirms that the client knows the transaction was saved successfully and that it can move on to saving the next transaction in the TransactionQueue. In the background, the block model schedules additional work depending on the kind of change made for the transaction. For example, the block model can schedule version history snapshots and indexing block text for a Quick Find function. The block model also notifies MessageStore, which is a real-time updates service, about the changes that were made.

The block model provides real-time updates to, for example, almost instantaneously show new blocks to members of a teamspace. Every client can have a long-lived WebSocket connection to the MessageStore. When the client renders a block (or page, or any other kind of record), the client subscribes to changes of that record from MessageStore using the WebSocket connection. When a team member opens the same page, the member is subscribed to changes of all those blocks. After changes have been made through the saveTransactions process, the API notifies MessageStore of new recorded versions. MessageStore finds client connections subscribed to those changing records and passes on the new version through their WebSocket connection. When a team member's client receives version update notifications from MessageStore, it verifies that version of the block in its local cache. Because the versions from the notification and the local block are different, the client sends a syncRecordValues API request to the server with the list of outdated client records. The server responds with the new record data. The client uses this response data to update the local cache with the new version of the records, then re-renders the user interface to display the latest block data.

Blocks can be shared instantaneously with collaborators. In one example, a page is loaded using only local data. On the web, block data is pulled from being in memory. On native apps, loading blocks that are not in memory are loaded from the RecordCache persisted storage. However, if missing block data is needed, the data is requested from an API. The API method for loading the data for a page is referred to herein as loadPageChunk; it descends from a starting point (likely the block ID of a page block) down the content tree and returns the blocks in the content tree plus any dependent records needed to properly render those blocks. Several layers of caching for loadPageChunk are used, but in the worst case, this API might need to make multiple trips to the database as it recursively crawls down the tree to find blocks and their record dependencies. All data loaded by loadPageChunk is put into memory (and saved in the RecordCache if using the app). Once the data is in memory, the page is laid out and rendered using React.

Software Platform

FIG. 1 is a block diagram of an example platform 100. The platform 100 provides users with an all-in-one workspace for data and project management. The platform 100 can include a user application 102, an AI tool 104, and a server 106. The user application 102, the AI tool 104, and the server 106 are in communication with each other via a network.

In some implementations, the user application 102 is a cross-platform software application configured to work on several computing platforms and web browsers. The user application 102 can include a variety of templates. A template refers to a prebuilt page that a user can add to a workspace within the user application 102. The templates can be directed to a variety of functions. Exemplary templates include a docs template 108, a wikis template 110, a projects template 112, a meeting and calendar template 114, and an email template 132. In some implementations, a user can generate, save, and share customized templates with other users.

The user application 102 templates can be based on content "blocks." For example, the templates of the user application 102 include a predefined and/or pre-organized set of blocks that can be customized by the user. Blocks are content containers within a template that can include text, images, objects, tables, maps, emails, and/or other pages (e.g., nested pages or sub-pages). Blocks can be assigned certain properties. The blocks are defined by boundaries having dimensions. The boundaries can be visible or non-visible for users. For example, a block can be assigned as a text block (e.g., a block including text content), a heading block (e.g., a block including a heading) or a sub-heading block having a specific location and style to assist in organizing a page. A block can be assigned as a list block to include content in a list format. A block can be assigned as an AI prompt block (also referred to as a "prompt block") that enables a user to provide instructions (e.g., prompts) to the AI tool 104 to perform functions. A block can also be assigned to include audio, video, and/or image content.

A user can add, edit, and remove content from the blocks. The user can also organize the content within a page by moving the blocks around. In some implementations, the blocks are shared (e.g., by copying and pasting) between the different templates within a workspace. For example, a block embedded within multiple templates can be configured to show edits synchronously.

The docs template 108 is a document generation and organization tool that can be used for generating a variety of documents. For example, the docs template 108 can be used to generate pages that are easy to organize, navigate, and format. The wikis template 110 is a knowledge management application having features similar to the pages generated by the docs template 108 but that can additionally be used as a database. The wikis template 110 can include, for example, tags configured to categorize pages by topic and/or include an indication of whether the provided information is verified to indicate its accuracy and reliability. The projects template 112 is a project management and note-taking software tool. The projects template 112 can allow the users, either as individuals or as teams, to plan, manage, and execute projects in a single forum. The meeting and calendar template 114 is a tool for managing tasks and timelines. In addition to traditional calendar features, the meeting and calendar template 114 can include blocks for categorizing and prioritizing scheduled tasks, generating to-do and action item lists, tracking productivity, etc. The various templates of the user application 102 can be included under a single workspace and include synchronized blocks. For example, a user can update a project deadline on the projects template 112, which can be automatically synchronized to the meeting and calendar template 114. The various templates of the user application 102 can be shared within a team, allowing multiple users to modify and update the workspace concurrently.

The email template 132 allows the users to customize their inbox by representing the inbox as a customizable database where the user can add custom columns and create custom views with layouts. One view can include multiple layouts including a calendar layout, a summary layout, and urgent information layout. Each view can include a customized structure including custom criteria, custom properties, and custom actions. The custom properties can be specific to a view such as artificial intelligence-extracted properties, and/or heuristic-based properties. The custom actions can trigger automatically when a message enters the view. The custom actions can include deterministic rules like "Archive this," or assistant workflows like responding to support messages by searching user applications 102 or filing support tickets. In addition, the view can include actions, such as buttons, that are custom to the view and perform operations on the messages in the inbox. Only the customized structure can be shared with other users of the system, or both the customized structure and the messages can be shared.

The AI tool 104 is an integrated AI assistant that enables AI-based functions for the user application 102. In one example, the AI tool 104 is based on a neural network architecture, such as the transformer 212 described in FIG. 2. Accordingly, the AI tool 104 can include one or more instances of a neural network 125, which can include model-related data stores, parameter stores, executables, API files, and so forth (collectively, referred to as a model framework). The AI tool 104 can interact with blocks embedded within the templates on a workspace of the user application 102. For example, the AI tool 104 can include a writing assistant tool 116, a knowledge management tool 118, a project management tool 120, and a meeting and scheduling tool 122. The AI tool 104 can also include a Q&A assistant 123*a*, UI agent 123*b*, AI/ML based query generator 123*c*, ranking engine 123*d*, and AI/ML model training engine 123*e*. The different tools of the AI tool 104 can be interconnected and interact with different blocks and templates of the user application 102.

The writing assistant tool 116 can operate as a generative AI tool for creating content for the blocks in accordance with instructions received from a user. Creating the content can include, for example, summarizing, generating new text, or brainstorming ideas. For example, in response to a prompt received as a user input that instructs the AI to describe what the climate is like in New York, the writing assistant tool 116 can generate a block including a text that describes the climate in New York. As another example, in response to a prompt that requests ideas on how to name a pet, the writing assistant tool 116 can generate a block including a list of creative pet names. The writing assistant tool 116 can also operate to modify existing text. For example, the writing assistant can shorten, lengthen, or translate existing text, correct grammar and typographical errors, or modify the style of the text (e.g., a social media style versus a formal style).

The knowledge management tool 118 can use AI to categorize, organize, and share knowledge included in the workspace. In some implementations, the knowledge management tool 118 can operate as a question-and-answer assistant (e.g., can include some or all of the functionality of the Q&A assistant 123*a*). For example, a user can provide instructions on a prompt block to ask a question. In response to receiving the question, the knowledge management tool 118 can provide an answer to the question, for example, based on information included in the wikis template 110 or, more generally, by searching blocks that the requestor has permission to access.

The project management tool 120 can provide AI support for the projects template 112. The AI support can include auto filling information based on changes within the workspace or automatically tracking project development. For example, the project management tool 120 can use AI for task automation, data analysis, real-time monitoring of project development, allocation of resources, and/or risk mitigation.

The meeting and scheduling tool 122 can use AI to organize meeting notes, unify meeting records, list key information from meeting minutes, and/or connect meeting notes with deliverable deadlines.

The Q&A assistant 123*a* can generate responses to user questions by searching content (e.g., workspaces, databases, pages, blocks) to which the requesting user has access permissions. The Q&A assistant 123*a* can include or be communicatively coupled to the UI agent 123*b*, AI/ML based query generator 123*c*, ranking engine 123*d*, and/or AI/ML model training engine 123*e*.

The UI agent 123*b* can enable a user to enter a question, which can be in the form of a natural-language prompt, also sometimes referred to as a natural-language command set or a natural-language instruction set. In some implementations, the UI agent 123*b* can include a GUI delivered to the client via a user application 102, and the prompt can be received via an input control displayed at the GUI (e.g., a textbox, a prompt block). In some implementations, the UI agent 123*b* can include or be communicatively coupled to a voice capture device (e.g., a voice-activated assistant, a microphone) that can capture the prompt in auditory form. The UI agent 123*b* can include a transcription module that converts the auditory-form prompt to text form.

The UI agent 123*b* can parse the user-entered prompt to extract or determine prompt elements. Prompt elements can include, for example, an instruction, a context, input data, and/or an output specification. For instance, using a natural-language prompt "please provide all recent images of a bear on a bicycle for a children's book illustration", the UI agent 123*b* could interpret "provide", "all", and "recent" as instructions, "images" as an output specification, "bear on a bicycle" as relevant input data (e.g., knowledge acquired by an AI model via prior training) and "children's book illustration" as context. The UI agent 123*b* could further preprocess the parsed term "provide" by, for example, cross-referencing it to an ontology of actionable instructions. The ontology of actionable instructions could be further refined based on the additional instructions in the prompt, such as "recent". For instance, if the term "provide" maps in an ontology to both "retrieve" and "generate", the UI agent 123*b* could discard the instruction "generate" by determining that the instruction "recent" refers to previously-generated items.

The UI agent 123*b* can provide the prompt elements (instructions, context, input data, and/or output specifications) to a downstream system or module (e.g., the AI/ML based query generator 123c, database 126, API 128). For instance, the UI agent 123b can generate a set of input features for the AI/ML based query generator 123c. The AI/ML based query generator 123c can use the input features to automatically generate computer-readable and/or computer-executable code, such as a query. For instance, the AI/ML based query generator 123c can determine the target database, page, block, and/or teamspace to query based on the prompt elements.

Continuing the example involving bears on bicycles, the AI/ML based query generator 123c can include a neural network trained (e.g., using the model training engine 123e) to determine that images (.jpg, .gif) reside in a particular database or collection of linked blocks (e.g., page) titled "IMAGES" and construct at least a portion of the query to search the database or collection of linked blocks titled "IMAGES" for vectorized representation of the content. As another example, if a user "writer" who submitted the request for images that include bears on bicycles has permission to access a particular database titled "STOCK ILLUSTRATIONS", the AI/ML based query generator 123c can set the target database or collection of linked blocks in the automatically generated query string to "STOCK ILLUSTRATIONS".

Furthermore, items in databases or collections of linked blocks can include properties that denote item categories to facilitate retrieval of data and minimize the size of the retrieved dataset. In such cases, the AI/ML based query generator 123c can execute an AI model to determine the category associated with "bear" and/or "bicycle" prior to generating a query. For instance, assuming the AI model returns a classifier "animals" for "bear", and assuming that the database "STOCK ILLUSTRATIONS" includes a property labeled "animals", the AI/ML based query generator 123c can construct its query (e.g., by generating the "property" portion of the query, the "where" portion of the query, or another syntactical element) to consider only the items in "STOCK ILLUSTRATIONS" where the property value equals "animals". In some implementations, the AI/ML based query generator 123c can generate API calls instead of or in addition to database queries. For instance, the AI/ML based query generator 123c can determine a target database 126, determine a particular integration 124 that defines a set of API 128 calls, and automatically generate and execute the appropriate API 128 calls against the database 126.

The UI agent 123b can receive and display, via the GUI, a result set in response to a query or API call. The result set can be post-processed prior to being provided via the GUI. For example, in some implementations, items in the result set can be ranked by the ranking engine 123d. For example, the ranking engine 123d can filter the result set based on relevance to a particular user, a document authority indicator, a similarity indicator (e.g., an indicator denoting a level of similarity between vectorized representation of text data and an input string, an indicator denoting a level of similarity between vectorized representation of an image descriptor and an input string), and so forth. The term "indicator" can refer to measures that include binary values (e.g., 0/1, yes/no), categorical values, scores, probabilities, frequencies and/or aggregations. In some implementations, items in the result set can be further filtered by the ranking engine 123d based on permissions and/or prompt elements. For example, if the instructions specify that "all recent" images of a bear on a bicycle should be retrieved, the ranking engine 123d can translate the term "recent" to a date range and apply the qualifier "all" (e.g., rather than applying the qualifier "top N") to determine the quantity of ranked items to display in a result set.

Further with respect to elements of the platform 100, the server 106 can include various units (e.g., including compute and storage units) that enable the operations of the AI tool 104 and workspaces of the user application 102. The server 106 can include an integrations unit 124, an application programming interface (API) 128, databases 126, and an administration (admin) unit 130. The databases 126 are configured to store data associated with the blocks. The data associated with the blocks can include information about the content included in the blocks, the function associated with the blocks, and/or any other information related to the blocks. The API 128 can be configured to communicate the block data between the user application 102, the AI tool 104, and the databases 126. The API 128 can also be configured to communicate with remote server systems, such as AI systems. For example, when a user performs a transaction within a block of a template of the user application 102 (e.g., in a docs template 108), the API 128 processes the transaction and saves the changes associated with the transaction to the database 126. The integrations unit 124 is a tool connecting the platform 100 with external systems and software platforms. Such external systems and platforms can include other databases (e.g., cloud storage spaces), messaging software applications, or audio or video conference applications. The administration unit 130 is configured to manage and maintain the operations and tasks of the server 106. For example, the administration unit 130 can manage user accounts, data storage, security, performance monitoring, etc. According to various implementations, the administration unit 130 and/or databases 126 can include various data stores for storage, retrieval and management of ontologies, user accounts, permissions, security settings, AI/ML models, AI/ML frameworks, and so forth.

Transformer for Neural Network

To assist in understanding the present disclosure, some concepts relevant to neural networks and machine learning (ML) are discussed herein. Generally, a neural network comprises a number of computation units (sometimes referred to as "neurons"). Each neuron receives an input value and applies a function to the input to generate an output value. The function typically includes a parameter (also referred to as a "weight") whose value is learned through the process of training. A plurality of neurons may be organized into a neural network layer (or simply "layer") and there may be multiple such layers in a neural network. The output of one layer may be provided as input to a subsequent layer. Thus, input to a neural network may be processed through a succession of layers until an output of the neural network is generated by a final layer. This is a simplistic discussion of neural networks and there may be more complex neural network designs that include feedback connections, skip connections, and/or other such possible connections between neurons and/or layers, which are not discussed in detail here.

A deep neural network (DNN) is a type of neural network having multiple layers and/or a large number of neurons. The term DNN can encompass any neural network having multiple layers, including convolutional neural networks (CNNs), recurrent neural networks (RNNs), multilayer perceptrons (MLPs), Generative Adversarial Networks (GANs), Variational Autoencoders (VAEs), and Auto-regressive Models, among others.

DNNs are often used as ML-based models for modeling complex behaviors (e.g., human language, image recognition, object classification, etc.) in order to improve the accuracy of outputs (e.g., more accurate predictions) such as, for example, as compared with models with fewer layers. In the present disclosure, the term "ML-based model" or more simply "ML model" may be understood to refer to a DNN. Training an ML model refers to a process of learning the values of the parameters (or weights) of the neurons in the layers such that the ML model is able to model the target behavior to a desired degree of accuracy. Training typically requires the use of a training dataset, which is a set of data that is relevant to the target behavior of the ML model.

As an example, to train an ML model that is intended to model human language (also referred to as a "language model"), the training dataset may be a collection of text documents, referred to as a "text corpus" (or simply referred to as a "corpus"). The corpus may represent a language domain (e.g., a single language), a subject domain (e.g., scientific papers), and/or may encompass another domain or domains, be they larger or smaller than a single language or subject domain. For example, a relatively large, multilingual, and non-subject-specific corpus can be created by extracting text from online webpages and/or publicly available social media posts. Training data can be annotated with ground truth labels (e.g., each data entry in the training dataset can be paired with a label) or may be unlabeled.

Training an ML model generally involves inputting into an ML model (e.g., an untrained ML model) training data to be processed by the ML model, processing the training data using the ML model, collecting the output generated by the ML model (e.g., based on the inputted training data), and comparing the output to a desired set of target values. If the training data is labeled, the desired target values may be, e.g., the ground truth labels of the training data. If the training data is unlabeled, the desired target value may be a reconstructed (or otherwise processed) version of the corresponding ML model input (e.g., in the case of an autoencoder), or can be a measure of some target observable effect on the environment (e.g., in the case of a reinforcement learning agent). The parameters of the ML model are updated based on a difference between the generated output value and the desired target value. For example, if the value outputted by the ML model is excessively high, the parameters may be adjusted so as to lower the output value in future training iterations. An objective function is a way to quantitatively represent how close the output value is to the target value. An objective function represents a quantity (or one or more quantities) to be optimized (e.g., minimize a loss or maximize a reward) in order to bring the output value as close to the target value as possible. The goal of training the ML model typically is to minimize a loss function or maximize a reward function.

The training data can be a subset of a larger data set. For example, a data set may be split into three mutually exclusive subsets: a training set, a validation (or cross-validation) set, and a testing set. The three subsets of data may be used sequentially during ML model training. For example, the training set may be first used to train one or more ML models, each ML model, e.g., having a particular architecture, having a particular training procedure, being describable by a set of model hyperparameters, and/or otherwise being varied from the other of the one or more ML models. The validation (or cross-validation) set may then be used as input data into the trained ML models to, e.g., measure the performance of the trained ML models and/or compare performance between them. Where hyperparameters are used, a new set of hyperparameters can be determined based on the measured performance of one or more of the trained ML models, and the first step of training (e.g., with the training set) may begin again on a different ML model described by the new set of determined hyperparameters. In this way, these steps can be repeated to produce a more performant trained ML model. Once such a trained ML model is obtained (e.g., after the hyperparameters have been adjusted to achieve a desired level of performance), a third step of collecting the output generated by the trained ML model applied to the third subset (the testing set) may begin. The output generated from the testing set may be compared with the corresponding desired target values to give a final assessment of the trained ML model's accuracy. Other segmentations of the larger data set and/or schemes for using the segments for training one or more ML models are possible.

Backpropagation is an algorithm for training an ML model. Backpropagation is used to adjust (e.g., update) the value of the parameters in the ML model, with the goal of optimizing the objective function. For example, a defined loss function is calculated by forward propagation of an input to obtain an output of the ML model and a comparison of the output value with the target value. Backpropagation calculates a gradient of the loss function with respect to the parameters of the ML model, and a gradient algorithm (e.g., gradient descent) is used to update (e.g., "learn") the parameters to reduce the loss function. Backpropagation is performed iteratively so that the loss function is converged or minimized. Other techniques for learning the parameters of the ML model can be used. The process of updating (or learning) the parameters over many iterations is referred to as training. Training may be carried out iteratively until a convergence condition is met (e.g., a predefined maximum number of iterations has been performed, or the value outputted by the ML model is sufficiently converged with the desired target value), after which the ML model is considered to be sufficiently trained. The values of the learned parameters can then be fixed and the ML model may be deployed to generate output in real-world applications (also referred to as "inference").

In some examples, a trained ML model may be fine-tuned, meaning that the values of the learned parameters may be adjusted slightly in order for the ML model to better model a specific task. Fine-tuning of an ML model typically involves further training the ML model on a number of data samples (which may be smaller in number/cardinality than those used to train the model initially) that closely target the specific task. For example, an ML model for generating natural language that has been trained generically on publicly available text corpora may be, e.g., fine-tuned by further training using specific training samples. The specific training samples can be used to generate language in a certain style or in a certain format. For example, the ML model can be trained to generate a blog post having a particular style and structure with a given topic.

Some concepts in ML-based language models are now discussed. It may be noted that, while the term "language model" has been commonly used to refer to an ML-based language model, there could exist non-ML language models. In the present disclosure, the term "language model" can refer to an ML-based language model (e.g., a language model that is implemented using a neural network or other ML architecture), unless stated otherwise. For example, unless stated otherwise, the "language model" encompasses LLMs.

A language model can use a neural network (typically a DNN) to perform natural language processing (NLP) tasks. A language model can be trained to model how words relate to each other in a textual sequence, based on probabilities.

A language model may contain hundreds of thousands of learned parameters or, in the case of an LLM, can contain millions or billions of learned parameters or more. As non-limiting examples, a language model can generate text, translate text, summarize text, answer questions, write code (e.g., Python, JavaScript, or other programming languages), classify text (e.g., to identify spam emails), create content for various purposes (e.g., social media content, factual content, or marketing content), or create personalized content for a particular individual or group of individuals. Language models can also be used for chatbots (e.g., virtual assistance).

A type of neural network architecture, referred to as a "transformer," can be used for language models. For example, the Bidirectional Encoder Representations from Transformers (BERT) model, the Transformer-XL model, and the Generative Pre-trained Transformer (GPT) models are types of transformers. A transformer is a type of neural network architecture that uses self-attention mechanisms in order to generate predicted output based on input data that has some sequential meaning (i.e., the order of the input data is meaningful, which is the case for most text input). Although transformer-based language models are described herein, it should be understood that the present disclosure may be applicable to any ML-based language model, including language models based on other neural network architectures such as recurrent neural network (RNN)-based language models.

Figure 2:
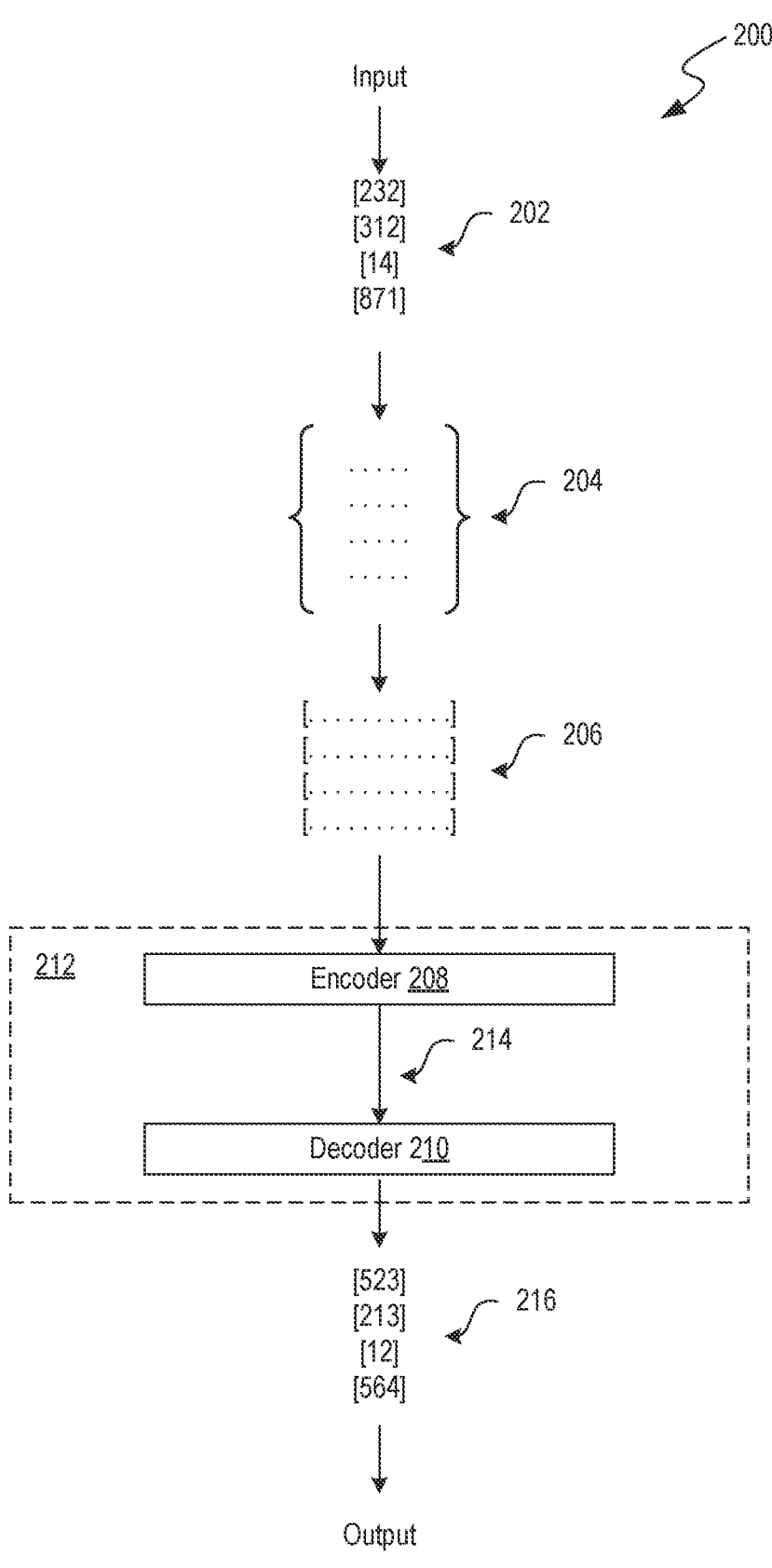
FIG. 2 is a block diagram of a transformer neural network, which may be used in examples of the present disclosure.

FIG. 2 is a block diagram of an example transformer 212. A transformer is a type of neural network architecture that uses self-attention mechanisms to generate predicted output based on input data that has some sequential meaning (e.g., the order of the input data is meaningful, which is the case for most text input). Self-attention is a mechanism that relates different positions of a single sequence to compute a representation of the same sequence. Although transformer-based language models are described herein, the present disclosure may be applicable to any ML-based language model, including language models based on other neural network architectures such as recurrent neural network (RNN)-based language models.

The transformer 212 includes an encoder 208 (which can include one or more encoder layers/blocks connected in series) and a decoder 210 (which can include one or more decoder layers/blocks connected in series). Generally, the encoder 208 and the decoder 210 each include multiple neural network layers, at least one of which can be a self-attention layer. The parameters of the neural network layers can be referred to as the parameters of the language model.

The transformer 212 can be trained to perform certain functions on a natural language input. Examples of the functions include summarizing existing content, brainstorming ideas, writing a rough draft, fixing spelling and grammar, and translating content. Summarizing can include extracting key points or themes from an existing content in a high-level summary. Brainstorming ideas can include generating a list of ideas based on provided input. For example, the ML model can generate a list of names for a startup or costumes for an upcoming party. Writing a rough draft can include generating writing in a particular style that could be useful as a starting point for the user's writing. The style can be identified as, e.g., an email, a blog post, a social media post, or a poem. Fixing spelling and grammar can include correcting errors in an existing input text. Translating can include converting an existing input text into a variety of different languages. In some implementations, the transformer 212 is trained to perform certain functions on other input formats than natural language input. For example, the input can include objects, images, audio content, or video content, or a combination thereof.

The transformer 212 can be trained on a text corpus that is labeled (e.g., annotated to indicate verbs, nouns) or unlabeled. LLMs can be trained on a large unlabeled corpus. The term "language model," as used herein, can include an ML-based language model (e.g., a language model that is implemented using a neural network or other ML architecture), unless stated otherwise. Some LLMs can be trained on a large multi-language, multi-domain corpus to enable the model to be versatile at a variety of language-based tasks such as generative tasks (e.g., generating human-like natural language responses to natural language input).

FIG. 2 illustrates an example of how the transformer 212 can process textual input data. Input to a language model (whether transformer-based or otherwise) typically is in the form of natural language that can be parsed into tokens. The term "token" in the context of language models and NLP has a different meaning from the use of the same term in other contexts such as data security. Tokenization, in the context of language models and NLP, refers to the process of parsing textual input (e.g., a character, a word, a phrase, a sentence, a paragraph) into a sequence of shorter segments that are converted to numerical representations referred to as tokens (or "compute tokens"). Typically, a token can be an integer that corresponds to the index of a text segment (e.g., a word) in a vocabulary dataset. Often, the vocabulary dataset is arranged by frequency of use. Commonly occurring text, such as punctuation, can have a lower vocabulary index in the dataset and thus be represented by a token having a smaller integer value than less commonly occurring text. Tokens frequently correspond to words, with or without white space appended. In some implementations, a token can correspond to a portion of a word.

For example, the word "greater" can be represented by a token for [great] and a second token for [er]. In another example, the text sequence "write a summary" can be parsed into the segments [write], [a], and [summary], each of which can be represented by a respective numerical token. In addition to tokens that are parsed from the textual sequence (e.g., tokens that correspond to words and punctuation), there can also be special tokens to encode non-textual information. For example, a [CLASS] token can be a special token that corresponds to a classification of the textual sequence (e.g., can classify the textual sequence as a list, a paragraph), an [EOT] token can be another special token that indicates the end of the textual sequence, other tokens can provide formatting information, etc.

In FIG. 2, a short sequence of tokens 202 corresponding to the input text is illustrated as input to the transformer 212. Tokenization of the text sequence into the tokens 202 can be performed by some pre-processing tokenization module such as, for example, a byte-pair encoding tokenizer (the "pre" referring to the tokenization occurring prior to the processing of the tokenized input by the LLM), which is not shown in FIG. 2 for brevity. In general, the token sequence that is inputted to the transformer 212 can be of any length up to a maximum length defined based on the dimensions of the transformer 212. Each token 202 in the token sequence is converted into an embedding vector 206 (also referred to as "embedding 206").

An embedding 206 is a learned numerical representation (such as, for example, a vector) of a token that captures some semantic meaning of the text segment represented by the token 202. The embedding 206 represents the text segment corresponding to the token 202 in a way such that embeddings corresponding to semantically related text are closer to each other in a vector space than embeddings corresponding to semantically unrelated text. For example, assuming that the words "write," "a," and "summary" each correspond to, respectively, a "write" token, an "a" token, and a "summary" token when tokenized, the embedding 206 corresponding to the "write" token will be closer to another embedding corresponding to the "jot down" token in the vector space as compared to the distance between the embedding 206 corresponding to the "write" token and another embedding corresponding to the "summary" token.

The vector space can be defined by the dimensions and values of the embedding vectors. Various techniques can be used to convert a token 202 to an embedding 206. For example, another trained ML model can be used to convert the token 202 into an embedding 206. In particular, another trained ML model can be used to convert the token 202 into an embedding 206 in a way that encodes additional information into the embedding 206 (e.g., a trained ML model can encode positional information about the position of the token 202 in the text sequence into the embedding 206). In some implementations, the numerical value of the token 202 can be used to look up the corresponding embedding in an embedding matrix 204, which can be learned during training of the transformer 212.

The generated embeddings 206 are input into the encoder 208. The encoder 208 serves to encode the embeddings 206 into feature vectors 214 that represent the latent features of the embeddings 206. The encoder 208 can encode positional information (i.e., information about the sequence of the input) in the feature vectors 214. The feature vectors 214 can have very high dimensionality (e.g., on the order of thousands or tens of thousands), with each element in a feature vector 214 corresponding to a respective feature. The numerical weight of each element in a feature vector 214 represents the importance of the corresponding feature. The space of all possible feature vectors 214 that can be generated by the encoder 208 can be referred to as a latent space or feature space.

Conceptually, the decoder 210 is designed to map the features represented by the feature vectors 214 into meaningful output, which can depend on the task that was assigned to the transformer 212. For example, if the transformer 212 is used for a translation task, the decoder 210 can map the feature vectors 214 into text output in a target language different from the language of the original tokens 202. Generally, in a generative language model, the decoder 210 serves to decode the feature vectors 214 into a sequence of tokens. The decoder 210 can generate output tokens 216 one by one. Each output token 216 can be fed back as input to the decoder 210 in order to generate the next output token 216. By feeding back the generated output and applying self-attention, the decoder 210 can generate a sequence of output tokens 216 that has sequential meaning (e.g., the resulting output text sequence is understandable as a sentence and obeys grammatical rules). The decoder 210 can generate output tokens 216 until a special [EOT] token (indicating the end of the text) is generated. The resulting sequence of output tokens 216 can then be converted to a text sequence in post-processing. For example, each output token 216 can be an integer number that corresponds to a vocabulary index. By looking up the text segment using the vocabulary index, the text segment corresponding to each output token 216 can be retrieved, the text segments can be concatenated together, and the final output text sequence can be obtained.

In some implementations, the input provided to the transformer 212 includes instructions to perform a function on an existing text. The output can include, for example, a modified version of the input text and instructions to modify the text. The modification can include summarizing, translating, correcting grammar or spelling, changing the style of the input text, lengthening or shortening the text, or changing the format of the text (e.g., adding bullet points or checkboxes). As an example, the input text can include meeting notes prepared by a user and the output can include a high-level summary of the meeting notes. In other examples, the input provided to the transformer includes a question or a request to generate text. The output can include a response to the question, text associated with the request, or a list of ideas associated with the request. For example, the input can include the question "What is the weather like in San Francisco?" and the output can include a description of the weather in San Francisco. As another example, the input can include a request to brainstorm names for a flower shop and the output can include a list of relevant names.

Although a general transformer architecture for a language model and its theory of operation have been described above, this is not intended to be limiting. Existing language models include language models that are based only on the encoder of the transformer or only on the decoder of the transformer. An encoder-only language model encodes the input text sequence into feature vectors that can then be further processed by a task-specific layer (e.g., a classification layer). BERT is an example of a language model that can be considered to be an encoder-only language model. A decoder-only language model accepts embeddings as input and can use auto-regression to generate an output text sequence. Transformer-XL and GPT-type models can be language models that are considered to be decoder-only language models.

Because GPT-type language models tend to have a large number of parameters, these language models can be considered LLMs. An example of a GPT-type LLM is GPT-3. GPT-3 is a type of GPT language model that has been trained (in an unsupervised manner) on a large corpus derived from documents available online to the public. GPT-3 has a very large number of learned parameters (on the order of hundreds of billions), can accept a large number of tokens as input (e.g., up to 2,048 input tokens), and is able to generate a large number of tokens as output (e.g., up to 2,048 tokens). GPT-3 has been trained as a generative model, meaning that it can process input text sequences to predictively generate a meaningful output text sequence. ChatGPT is built on top of a GPT-type LLM and has been fine-tuned with training datasets based on text-based chats (e.g., chatbot conversations). ChatGPT is designed for processing natural language, receiving chat-like inputs, and generating chat-like outputs.

A computer system can access a remote language model (e.g., a cloud-based language model), such as ChatGPT or GPT-3, via a software interface (e.g., an API). Additionally or alternatively, such a remote language model can be accessed via a network such as the Internet. In some implementations, such as, for example, potentially in the case of a cloud-based language model, a remote language model can be hosted by a computer system that can include a plurality of cooperating (e.g., cooperating via a network) computer systems that can be in, for example, a distributed arrangement. Notably, a remote language model can employ multiple processors (e.g., hardware processors such as, for example, processors of cooperating computer systems). Indeed, processing of inputs by an LLM can be computationally expensive/can involve a large number of operations (e.g., many instructions can be executed/large data structures can be accessed from memory), and providing output in a required timeframe (e.g., real time or near real time) can require the use of a plurality of processors/cooperating computing devices as discussed above.

Inputs to an LLM can be referred to as a prompt, which is a natural language input that includes instructions to the LLM to generate a desired output. A computer system can generate a prompt that is provided as input to the LLM via an API (e.g., the API 128 in FIG. 1). As described above, the prompt can optionally be processed or pre-processed into a token sequence prior to being provided as input to the LLM via its API. A prompt can include one or more examples of the desired output, which provides the LLM with additional information to enable the LLM to generate output according to the desired output. Additionally or alternatively, the examples included in a prompt can provide inputs (e.g., example inputs) corresponding to/as can be expected to result in the desired outputs provided. A one-shot prompt refers to a prompt that includes one example, and a few-shot prompt refers to a prompt that includes multiple examples. A prompt that includes no examples can be referred to as a zero-shot prompt.

Hierarchical Organizational Blocks in a Workspace

Figure 3A:
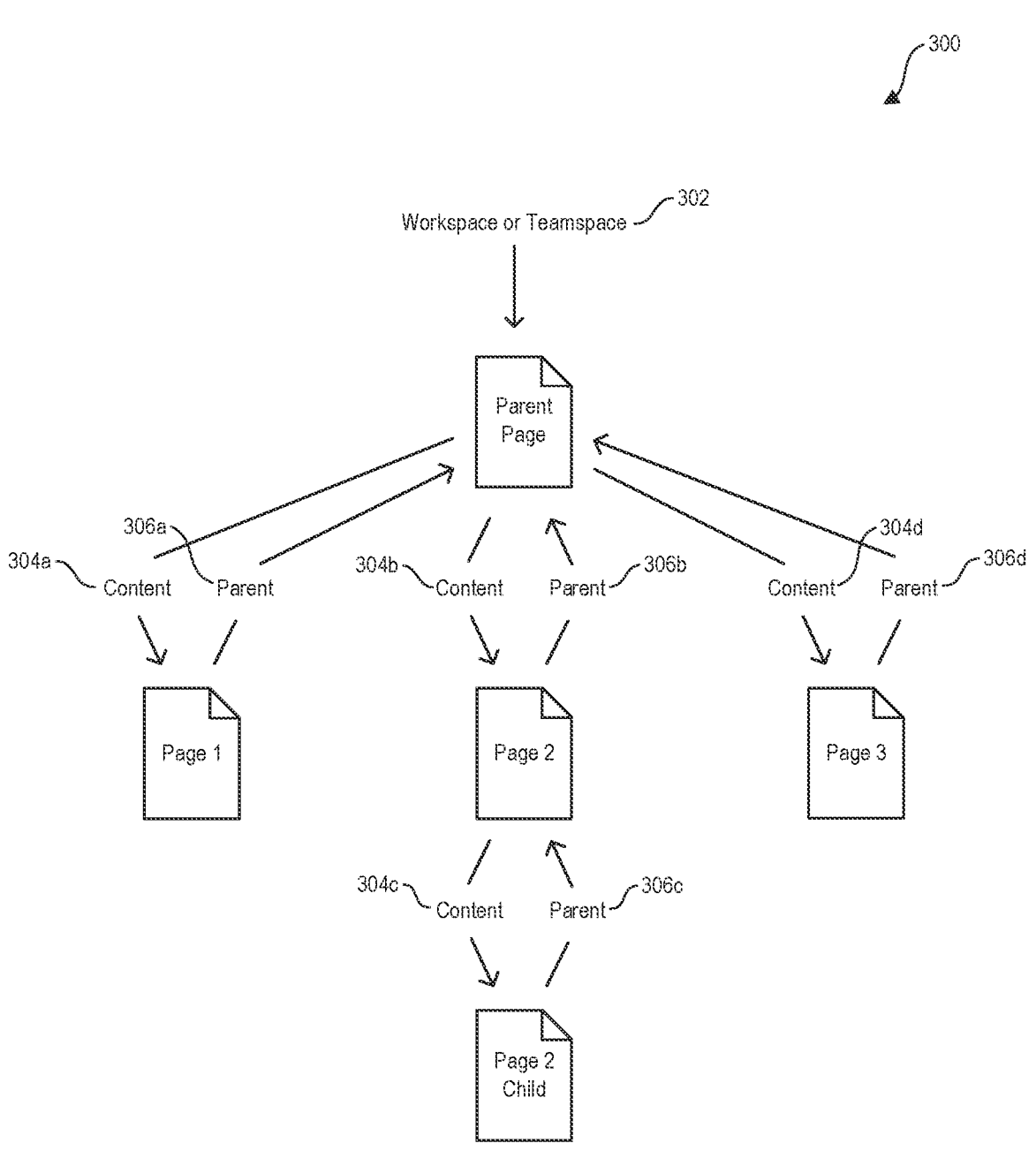
FIG. 3A is a block diagram illustrating a hierarchical organization of pages in a workspace, according to some arrangements.

FIG. 3A is a block diagram illustrating a hierarchical organization of pages in a workspace. As described with respect to the block data model of the present technology, a workspace can include multiple pages (e.g., page blocks). The pages (e.g., including parent pages and child or nested pages) can be arranged hierarchically within the workspace or one or more teamspaces 302, as shown in FIG. 3A. The page can include a block such as tabs, lists, images, tables, etc.

A teamspace 302 can refer to a collaborative space associated with a team or an organization that is hierarchically below a workspace. For example, a workspace can include a teamspace 302 accessible by all users of an organization and multiple teamspaces 302 that are accessible by users of different teams. Accessibility generally refers to creating, editing, and/or viewing content (e.g., pages) included in the workspace or the one or more teamspaces 302.

In the hierarchical organization illustrated in FIG. 3A, a parent page (e.g., "Parent Page") is located hierarchically below the workspace or a teamspace 302. The parent page includes three children pages (e.g., "Page 1," "Page 2," and "Page 3"). Each of the child pages can further include subpages (e.g., "Page 2 Child" which is a grandchild of "Parent Page" and child of "Page 2"). The "Content" arrows (304*a*-304*d*) in FIG. 3A indicate the relationship between the parents and children while the "Parent" arrows (306*a*-306*d*) indicate the inheritance of access permissions. The child pages inherit access permission from the (immediate) parent page under which they are located hierarchically (e.g., which is above them in the tree). For example, "Page 2" inherited the access permission of the "Parent page" as a default when it was created under its parent page. Similarly, "Page 2 Child" inherited the access permission of the parent page as a default when it was created under its parent page. "Parent Page," "Page 2," and "Page 2 Child" thereby have the same access permission within the workspace.

The relationships and organization of the content can be modified by changing the location of the pages. For example, when a child page is moved to be under a different parent, the child page's access permission modifies to correspond to the access permission of the new parent. Also, when the access permission of "Parent Page" is modified, the access permission of "Page 1," "Page 2," and "Page 3" can be automatically modified to correspond to the access permission of "Parent Page" based on the inheritance character of access permissions.

In contrast, however, a user can modify the access permission of the children independently of their parents. For example, the user can modify the access permission of "Page 2 Child" in FIG. 3A so that it is different from the access permission of "Page 2" and "Parent Page." The access permission of "Page 2 Child" can be modified to be broader or narrower than the access permission of its parents. As an example, "Page 2 Child" can be shared on the internet while "Page 2" is only shared internally to the users associated with the workspace. As another example, "Page 2 Child" can be shared only with an individual user while "Page 2" is shared with a group of users (e.g., a team of the organization associated with the workspace). In some implementations, the hierarchical inheritance of the access permissions described herein can be modified from the previous description. For example, the access permissions of all the pages (parent and children) can be defined as independently changeable.

Figure 3B:
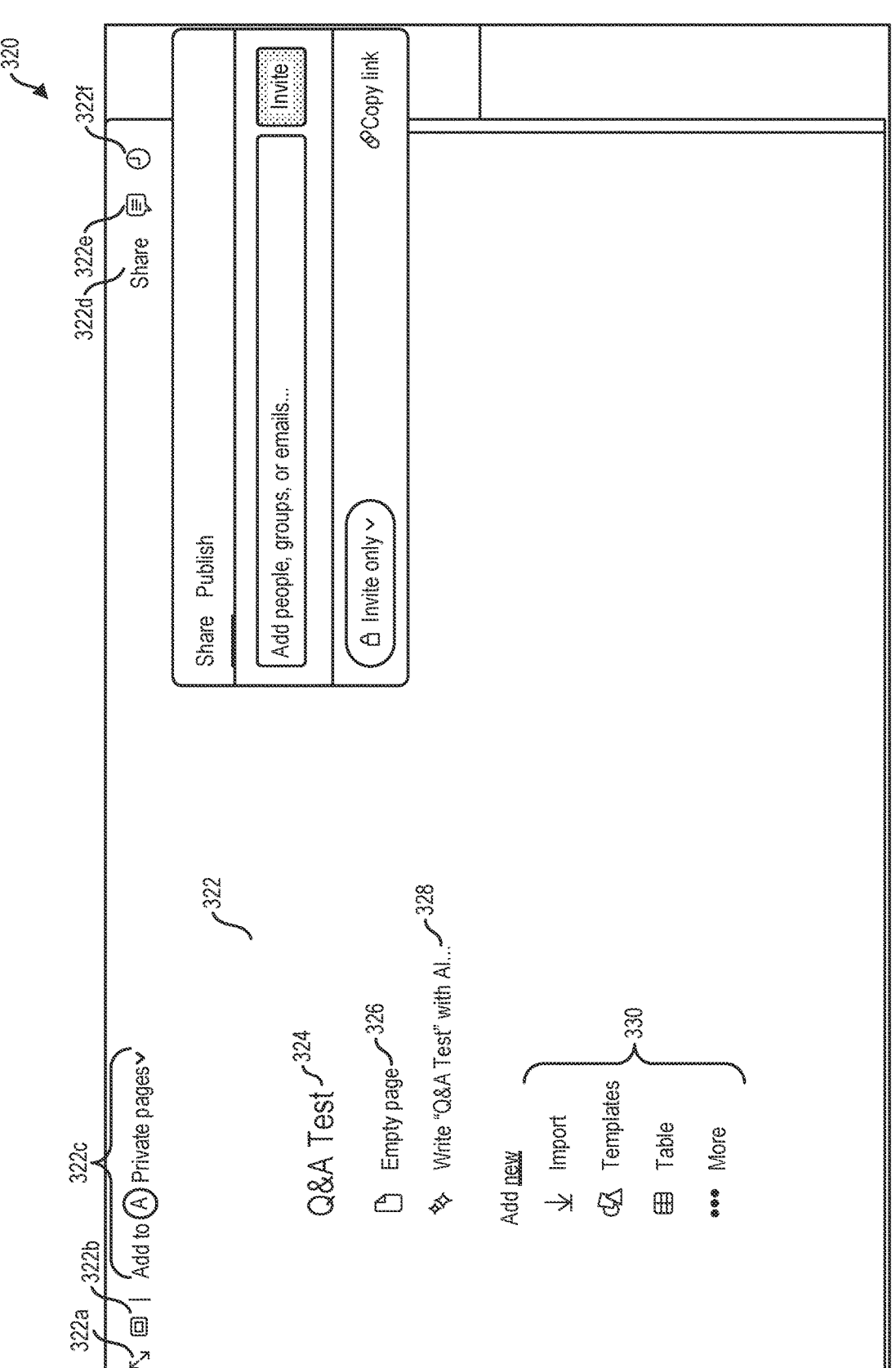
FIG. 3B is an example graphical user interface (GUI) that enables creation of a page, according to some arrangements.
Figure 3C:
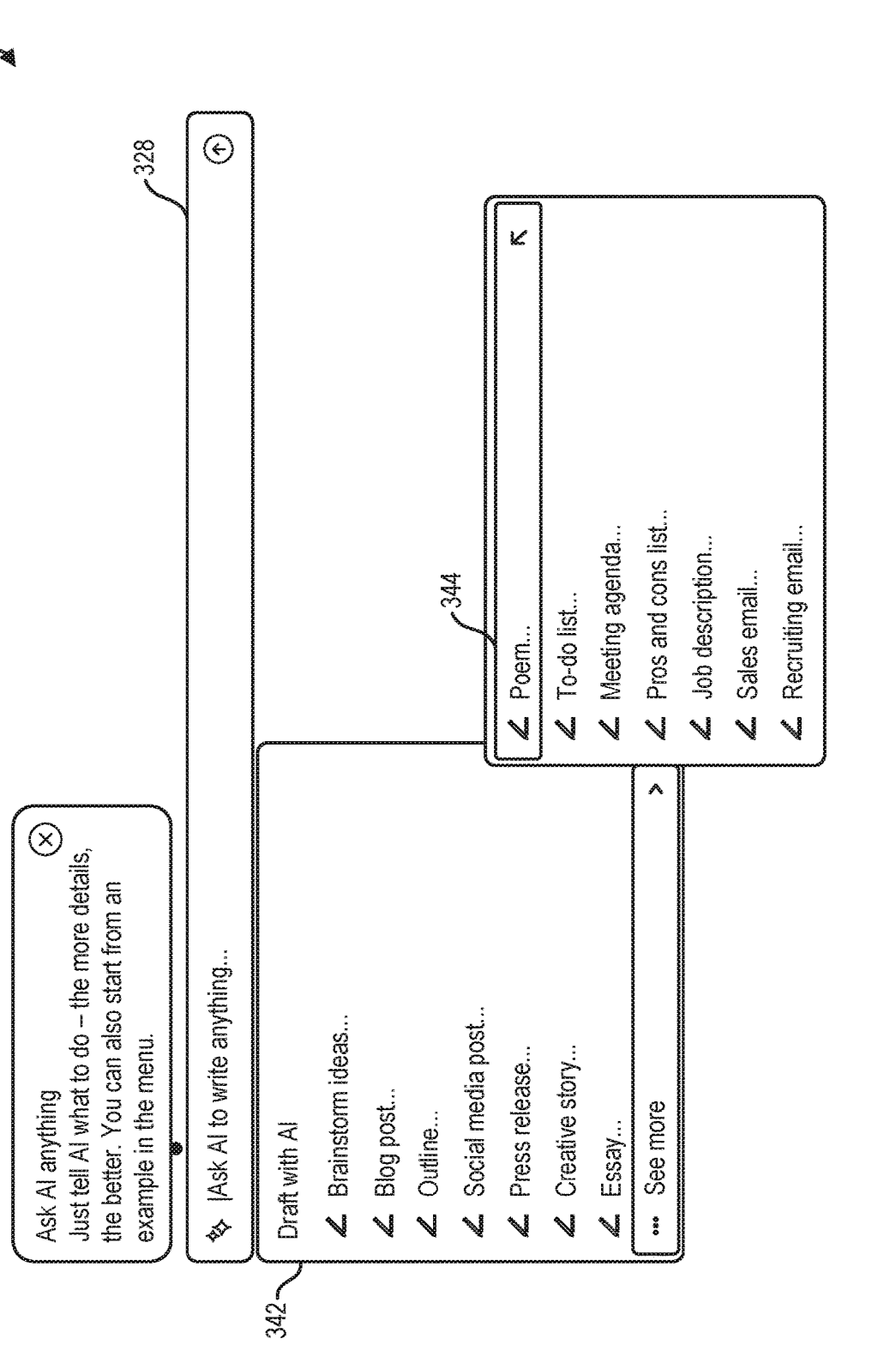
FIG. 3C is an example GUI that enables augmentation of a particular page with artificial intelligence/machine learning (AI/ML) generated content, according to some arrangements.
Figure 3D:
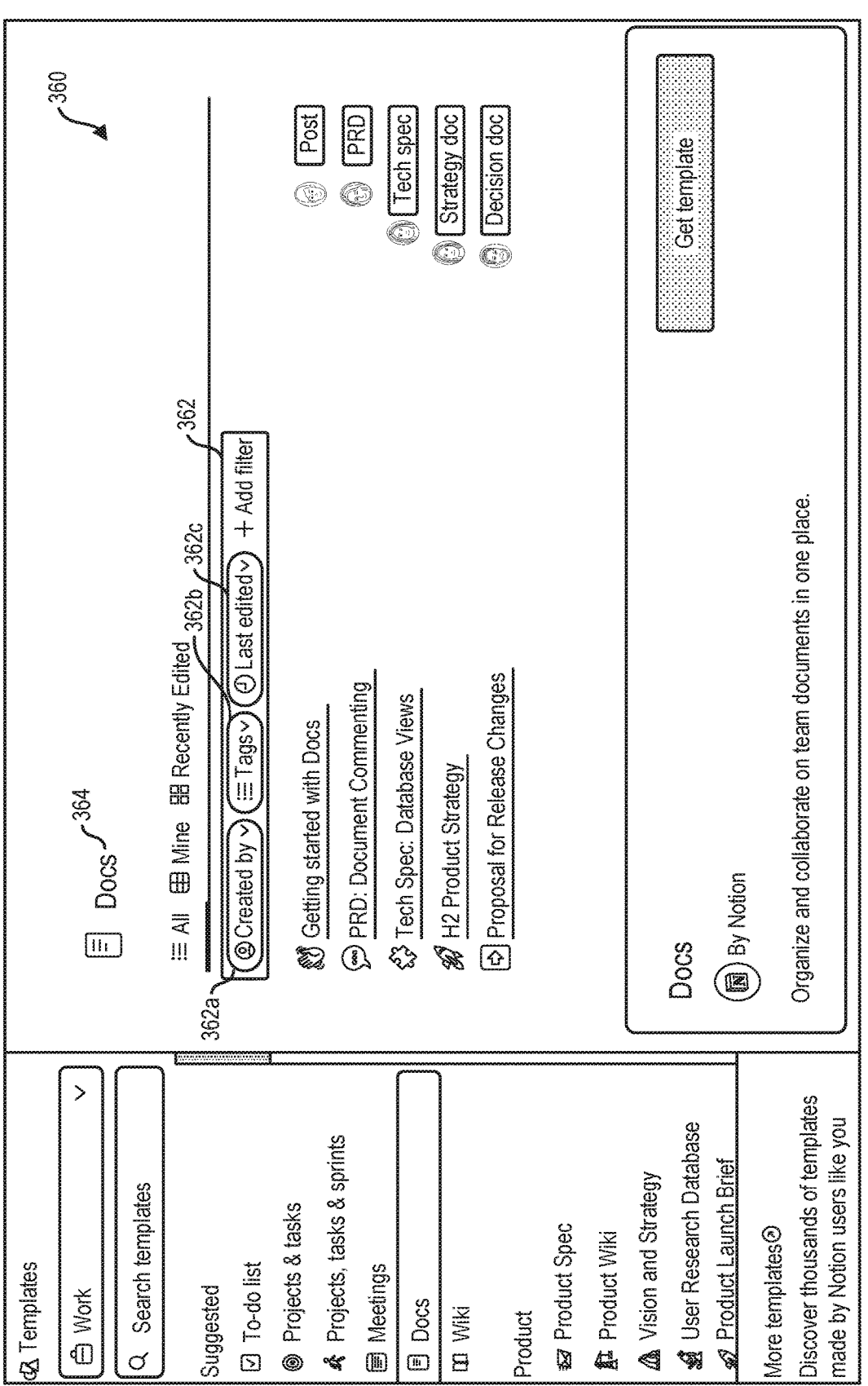
FIG. 3D is an example GUI that illustrates aspects of page properties, according to some arrangements.

FIG. 3B is an example graphical user interface (GUI) 320 that enables creation of page(s) 322, according to some arrangements. FIG. 3C is an example GUI 340 that enables augmentation of a particular page with AI-generated content, according to some arrangements. FIG. 3D is an example GUI 360 that illustrates aspects of page properties, according to some arrangements. As a general overview, a page can include one or more content blocks and user-interactive controls. The user-interactive controls can enable text writing, text editing, markdown operations, content management (addition, deletion, merging, import, duplication), template management, content customization, file management (e.g., images, video, audio, multimedia), code generation, database generation, project plan generation, block synchronization, and so forth.

Organizing sets of hierarchical blocks in pages provides a host of technical advantages, including the ability to create relational linkages (between blocks and/or pages) in multimodal content, ability to dynamically create multimodal content with various content types added on-demand, ability to synchronize block editing operations when a particular block is included in multiple pages, and ability to optimize multimodal content for AI-based analytical operations such that performance metrics of AI-based models (e.g., accuracy, recall, F-1 score, and so forth) are maximized. For example, when a page includes multimodal content distributed across several blocks, collections of block properties can vary across modalities, which can be represented by blocks, and block properties can serve as built-in data labels to train neural networks on the block structure and content.

A particular page can include textual elements, graphical elements, links, computer-readable code, and/or computer-executable code. As shown in FIG. 3B, an example page 322 includes an expand control 322*a*, a page positioning control 322*b*, and an add to control 322*c*, which enables the user to add the page 322 to a particular teamspace. In some implementations, detecting a user interaction with an add to control 322*c* causes the GUI 320 to generate and display a list of suggested teamspaces. The list of suggested teamspaces can be determined, for example, by the user's permissions, the user's frequency of interaction with certain teamspaces, the user's recency of interaction with certain teamspaces (e.g., within the past 24 hours, within the past week), and/or the level of authority of a particular teamspace. The example page 322 further includes a share control 322*d*, which enables the user to cause the platform to generate a link to send to invited collaborators and/or to publish page 322 as a web page. Upon detecting a user interaction indicative of an instruction to publish the page 322 as a web page, the platform can generate and display an additional UI control, which can enable the user to specify a target site, link expiration date, editing permissions, commenting permissions, search engine indexing permissions, settings to enable other people to duplicate a particular public page to their workspaces or teamspaces, and so forth. The example page 322 further includes a view comments control 322*e*, which enables the user to cause the platform to display comments associated with the page 322. The example page 322 further includes a view changes control 322*f*, which enables the user to cause the platform to display prior changes associated to content or properties of the page 322.

As shown, the example page 322 further includes a title 324, an empty page control 326, and a prompt block 328. Upon detecting a user interaction with (e.g., clicking on, tapping on, hovering a mouse over) the prompt block 328, the page 322 can cause execution of computer code bound to the prompt block 328. The computer code can, for example, cause the page 320 to generate and display the GUI 340 of FIG. 3C. The GUI 340 can include an expanded prompt block 328, which enables augmentation of the page 320 with content generated by the AI tool 104 of FIG. 1. The user is enabled to enter a natural-language prompt in the prompt block 328, which can trigger, for example, an AI framework (e.g., the transformer framework described in relation to FIG. 2, an LLM, etc.) to generate output in according to the prompt. In some implementations, upon detecting a user interaction with the prompt block 328, the page 322 can cause execution of computer code to display expanded lists 342 and/or 344, which enable the user to further specify prompt elements (e.g., input, context, output, and/or instructions).

As shown, the example page 322 further includes an add new control 330. The add new control 330 enables users to cause the platform to generate content items with predetermined elements, such as format (e.g., a table), layout (e.g., in accordance with a template), and so forth. The add new control 330 can also enable users to import and/or link items (e.g., according to specifications, executables, API definition files, and/or configuration information managed by the integrations 124). Imported items can include, for example, email files (e.g., .msg), .zip files, HTML files, .csv files, text files, markdown files, third-party system files, and so forth. Additionally, the add new control 330 can enable users to add new templates (e.g., project templates, task templates, product-related templates, startup-related templates, operations-related templates, engineering-related templates, design-related templates, human-resources related templates, IT-related templates and so forth), timelines (e.g., Gantt charts), tables, and so forth. The Q&A assistant 123*a* can be configured to search content that is linked and/or imported via integrations 124 or via another suitable method of connecting to an external computing system. For example, in various implementations, the Q&A assistant 123*a* can access and query linked external content in parallel with querying the block-based data, access and import (e.g., generate blocks and/or embeddings based on) external content, and/or query previously linked and/or imported external content.

Various types of pages that can be added via the add new control 330 can have various attributes, which can include properties. FIG. 3D is an example GUI 360 that illustrates aspects of page properties 362, according to some arrangements. Collections of properties 362 can be predefined for particular templates. For example, a document template 364 can include property collections for blocks in the template. The property collections can, for example, specify the creator 362*a*, tags 362*b*, and last edited date/time 362*c*. As another example, a project template can include properties that include task statuses, task due dates, task assignees, task priorities, task dependencies, and so forth. In some implementations, the GUI enables users to add various custom properties. Some properties can be AI-generated (e.g., AI summary, AI key information, AI custom autofill, AI translation). Some properties can include function calls to integrations, such as Google integrations, GitHub integrations, Figma integrations, Zendesk integrations, and so forth. Properties can include text, numerical information, email addresses, phone numbers, formulas, roll-ups, time stamps, permission information and/or user identifiers, files, media, URLs, and so forth.

The AI tool 104 and/or various modules of the AI tool 104 can be trained on block properties, such as properties 362. Block properties can be utilized, alone or in conjunction with other elements, such as block types, block dependencies, block content values, block content types, and/or block format, to train the neural networks of the AI tool 104. Because block property collections do not change as often as block content, and because block property collections can be built-in labels useful for training, training the neural networks of the AI tool 104 on block properties enables the AI tool 104 to be easily retrained on comparatively smaller data sets, such as property collections or even smaller sets of updates to the property collections. In this manner, the risk of model drift (decay of a model's predictive power as a result of changes in real-world environments) can be managed and reduced such that the model retains predictive relevancy as measured by a suitable performance metric (e.g., accuracy, recall, F-1 score, and so forth).

In an example, the neural networks of AI/ML based query generator 123*c* can be trained (e.g., using the model training engine 123*e*) on various block types, sets of blocks, and their corresponding property collections, such that the AI/ML based query generator 123*c* is enabled to generate executable block queries based on natural-language prompts. For instance, the neural networks can be trained to automatically learn that a particular block type (e.g., "page") can have a certain property (e.g., "last_updated_date"). As another example, the neural networks can be trained to automatically learn that a particular template (e.g., "shopping list") can have a certain property (e.g., "tags", which can include values such as "grocery list", "books", "presents", etc.). Accordingly, when generating response options for an example prompt, "please generate a list of grocery items I have bought more than once lately", the AI/ML based query generator 123*c* can include a neural network 125 (e.g., prompt tokenizer neural network) trained on template properties to determine that "shopping list[s]" are likely responsive documents. The prompt tokenizer neural network can also be trained on the data values in the "tags" properties of documents (e.g., blocks or collections of blocks) structured according to the template "shopping list". Accordingly, the prompt tokenizer neural network can further determine that documents tagged "grocery list" are likely responsive. As the next step, the prompt tokenizer neural network can be further trained on content types and/or formats of block content, such that the prompt tokenizer neural network can automatically learn that the user is looking for a set that represents overlapping values across at least two grocery lists. The prompt tokenizer neural network can further use the tokenized representation of "lately" to generate a suitable date range for the "last_updated_date" property across the set of grocery lists (such as, for example, the past two weeks, the past 30 days, the past 180 days and so forth).

Machine Learning Based Q&A Assistant

Figure 4B:
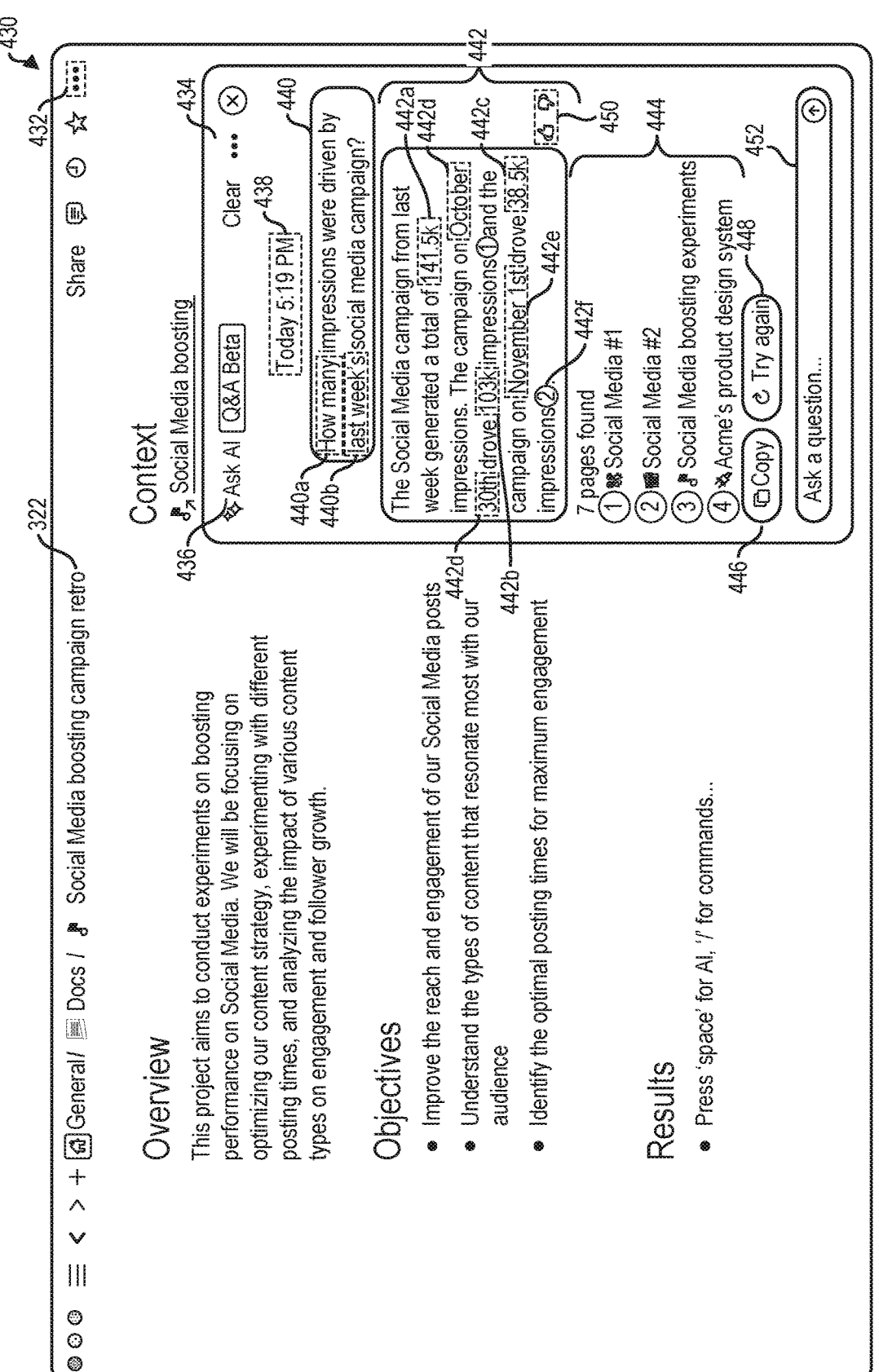
FIG. 4B is an example GUI of a chatbot Q&A assistant where the chatbot visualizes the output of a ranking engine of the Q&A assistant, according to some arrangements.

FIG. 4A is a flowchart showing an example method 400 of operation of an AI/ML based question and answer (Q&A) assistant 434, according to some arrangements. FIG. 4B is an example GUI 430 of a chatbot Q&A assistant UI 434 where the chatbot Q&A assistant UI 434 visualizes the output of the ranking engine 123d of the Q&A assistant 123a of FIG. 1, according to some arrangements. The Q&A assistant 123a of FIG. 1 can include various engines described in relation to FIG. 1, such as the UI agent 123b, AI/ML based query generator 123c, ranking engine 123d, and/or model training engine 123e. The Q&A assistant 123a of FIG. 1 can also include (e.g., separately or as part of the UI agent 123b) the chatbot Q&A assistant UI 434. Furthermore, the Q&A assistant 123a of FIG. 1 can include (e.g., separately or as part of the UI agent 123b) another UI that performs the operations described below in relation to the chatbot Q&A assistant UI 434. Accordingly, one of skill will appreciate that the features described in relation to the chatbot Q&A assistant UI 434 can, in some variants, be performed via a user-interactive computer program that simulates an actor in a conversation. The user-interactive computer program can be embodied on circuitry included in a variety of form factors, such as voice assistant ("smart speaker"), web page, desktop application, mobile application, applet, or dialog box.

As a general overview, the Q&A assistant can be optimized to automatically search the block-based data structures described herein to identify, retrieve, analyze, and synthesize information that a particular user has permission to access. Configuring the Q&A assistant to automatically search block-based data structures provides a technical advantage of improving training capabilities of the neural networks 125 that underlie the Q&A assistant while limiting the training data to items that exclude customer-confidential content, and/or forgoing training the system on content altogether. For example, the Q&A assistant can be trained on block properties rather than content, which can improve predictive capabilities of the neural networks while maintaining data privacy. Furthermore, as an additional technical advantage, the block properties can function as built-in data labels, which can significantly simplify the process of generating training data. Furthermore, as an additional technical advantage, the block properties can include previously-generated properties (e.g., AI-generated summaries), which can be scrubbed to remove confidential information but retain a level of responsiveness to anticipated queries. Furthermore, as an additional technical advantage, automatically searching block-based data structures as described herein enables analytics, aggregations, and synthesis of multimodal content, such as images, video, audio, and/or text. For example, in response to a single prompt, more than one query can be executed to generate result sets that include content in different modalities. The result sets can be consolidated in post-processing such that a single response includes items or links to items in multiple modalities. For instance, a particular response can include a set of citations to pages that include responsive blocks of text, images, audio, video, multimedia files, and so forth.

The Q&A assistant can also include automatic generative AI capabilities that enable the Q&A assistant to augment the generated responses. For example, the Q&A assistant can generate responses and/or calculations based on items in a particular teamspace or workspace to which a user has access permissions, and then include the responses and/or calculations in automatically generated narratives.

In operation of the platform 100 of FIG. 1, when the method 400 of FIG. 4A is performed, at 402, the Q&A assistant 123a of FIG. 1 can receive a natural-language prompt and generate a set of tokens based on the natural-language prompt. For example, as shown in FIG. 4B, a user can cause the platform to generate and display the chatbot Q&A assistant UI 434 by, for example, interacting with (e.g., selecting, clicking on, tapping on) the item 432, which can be accessible via page 322. The chatbot Q&A assistant UI 434 can include the prompt control 452, which can allow the user to enter a natural-language prompt 440. The natural-language prompt 440 can include various items (e.g., 440a, 440b), which can be used by the Q&A assistant 123a to generate the set of tokens. For example, the tokens can be generated by parsing items from the natural-language prompt 440. As another example, the tokens can be generated by referencing parsed items to an ontology. As another example, the tokens can be generated by providing the parsed items to a trained neural network 125 (e.g., the prompt tokenizer neural network) as inputs. For instance, the tokens can be generated by providing parsed textual items, such as "how many" (440a) to a trained neural network that can generate an output value or set of values that correspond to a recommended aggregation ("sum", "average", and so forth). As another example, the tokens can be generated by using additional items, such as the current date/time 438, in combination with parsed items (e.g., temporal indication 440b).

At 404, the Q&A assistant 123a of FIG. 1 can determine, and provide to the AI/ML based query generator 123c, contexts, data sources, and/or parameters for a query, where the query is automatically generated by the AI/ML based query generator 123c as described further herein.

Contexts can specify query domains and can relate to items in the block-based data structures. The items can include block types, block dependencies, block content values, block content types, and/or block formats. Advantageously, contexts can optimize the query generation operations described herein by reducing the set of data items to be considered by a neural network (e.g., a query generator neural network) to generate a query string (e.g., to generate predictions for target data source and/or parameters). For example, the Q&A assistant 123a can determine a content type context for a query by generating a set of unique item types (e.g., workspaces, teamspaces, pages, blocks, templates) to which the requestor has access permissions such that these unique item types can be considered by the neural network. The Q&A assistant 123a can determine a permission context for a query by generating a set of items (e.g., workspaces, teamspaces, pages, blocks, templates) that the user created or has access permissions for such that permitted items can be considered by the neural network. As another example, the Q&A assistant 123a can determine an entity context for a query by generating a set of properties responsive to a parsed item, such that specific items (e.g., workspaces, teamspaces, pages, blocks, templates) that have the responsive properties can be considered by the neural network. The neural network can learn to consider these parameters through training, as described, for example, in relation to FIGS. 6A and 6B.

Data sources can specify entities in the block-based schema (e.g., workspaces, teamspaces, pages, blocks, templates) that are likely to be responsive (e.g., as determined by the properties) to the natural-language prompt 440. In some scenarios, the data source is specified directly in the natural-language prompt 440. In other implementations, the data source is not directly specified, and the data source tokens can be determined by the AI/ML based query generator 123c based on the context tokens.

Figures 1, 2, 5B:
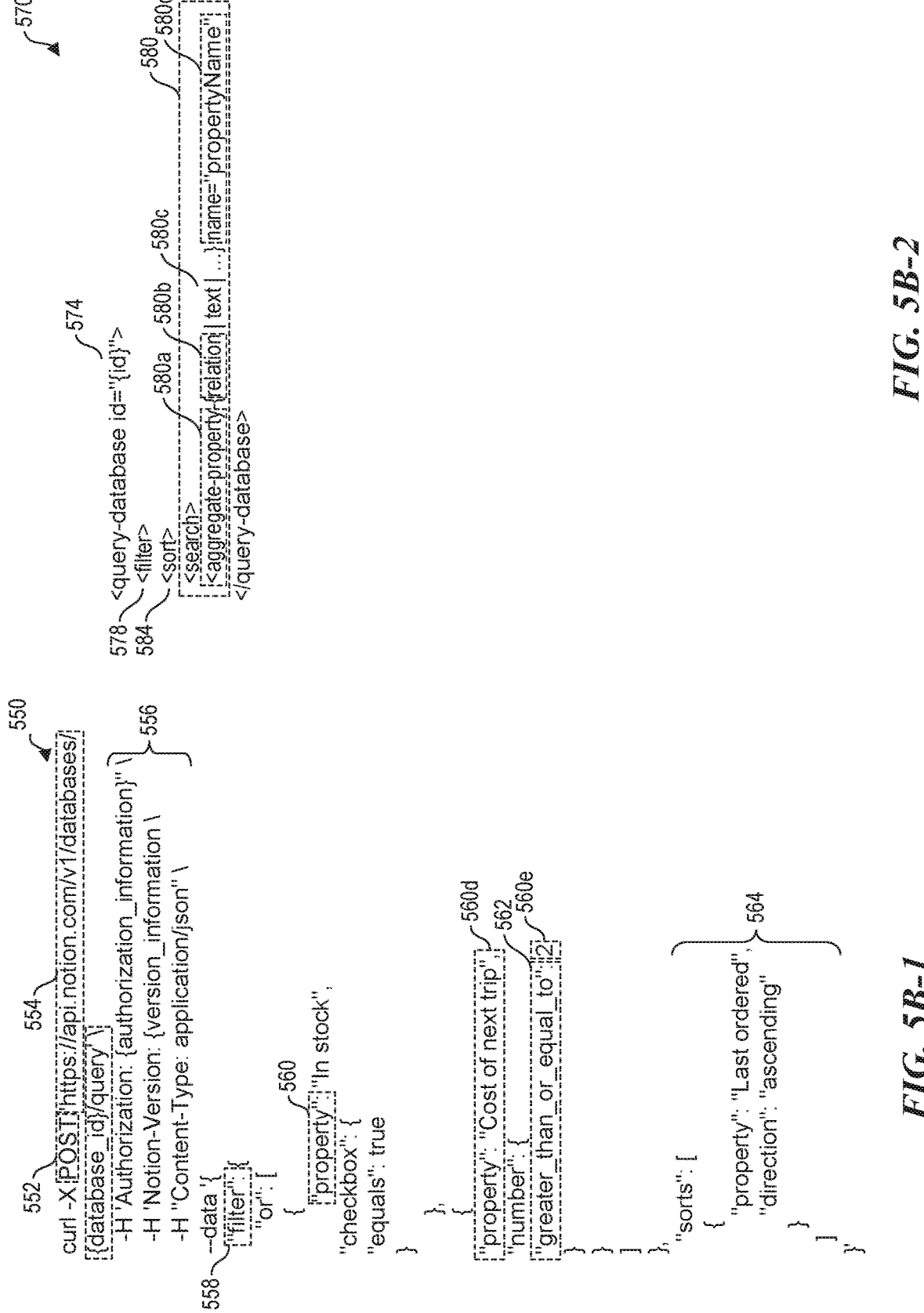

Parameters can specify selection criteria for items as described further herein in relation to FIG. 5A and FIG. 5B. As discussed above, parameters can be parsed from the natural-language prompt 440 or generated using ontologies, programming logic, and/or AI models.

At 406, the Q&A assistant 123a of FIG. 1 can generate a set of result sets by executing one or more queries in the set of queries. For example, in response to a natural-language prompt "how many impressions were driven by last week's social media campaign?", a particular query in the set of queries can search pages (and their corresponding blocks) to which the requestor has access permissions to generate impression statistics. In some scenarios, the natural-language prompt 440 can be answered by generating and executing a single query, such that the set of result sets can contain one result set. For instance, an example result set can include items 442b, 442c, 442e, and 442e. In some scenarios, the natural-language prompt 440 can be answered by generating and executing multiple queries (e.g., independent queries or sequences of queries).

At 408, the Q&A assistant 123a of FIG. 1 can generate synthetic items using items in the result set(s). For example, the Q&A assistant 123a can generate item 442a ("a total of 141.5K impressions") using impression counts 442b and 442c. Other examples of synthetic items can include aggregations, extractive summaries, translations, calculations, and so forth. In some implementations, the synthetic items can be generated by providing items from the result set to a trained AI model (e.g., to a response generator neural network) as input features to generate summaries, translations, calculations, and/or aggregations.

At 410, the Q&A assistant 123a of FIG. 1 can generate a response 442 to the natural-language prompt. In some implementations, the result set(s) and/or synthetic items are provided to a generative AI model (e.g., the response generator neural network) to generate a narrative (e.g., one or more sentences or paragraphs) that includes items from the result set(s) and/or synthetic values. In some implementations, these items can include previously-captured information, such as information and/or output associated with previous questions (e.g., in a chain of related questions). The response 442 can include automatically-generated citations 442f to source items (e.g., workspaces, teamspaces, pages, blocks, templates, URLs) used to generate the response 442. The citations 442f can refer to items in the block-based data structure and/or to third-party items (e.g., URLs). Advantageously, the ability to refer to specific items in the block-based data structure enables precise citations to specific items (e.g., paragraphs). In some implementations, the citations 442f are included in a block citation set 444 generated by the ranking engine 123d. The block citation set 444 can be an ordered and/or ranked citation set, where the citations 442f can be indicative of the order and/or rank of a particular item. Accordingly, the citations 442f can be formatted to include visual emphasis elements based on the order and/or rank (or ranges thereof, such as 1-5, 5-10). The visual emphasis elements can include shape, color, graphics, numbering, alt-text and/or other elements. The citations can include automatically-generated, navigable hyperlinks that include block and/or page identifiers and can be accessed from the chatbot Q&A assistant UI 434 by interacting with items in the block citation set 444.

The chatbot Q&A assistant UI 434 enables users to interact with and provide feedback regarding automatically-generated responses 442. For example, users can engage with the feedback controls 450, which can be used in further training the AI models executed in the process of generating the response 442. The users can also copy 446 a particular response 442 and/or cause the chatbot Q&A assistant UI 434 to try again 448.

Query Generator for the Machine Learning Based Q&A Assistant

FIG. 5A is a flowchart showing an example method 500 of operation of the AI/ML based query generator 123c for the Q&A assistant 123a of FIG. 1, according to some arrangements. As a general overview, the AI/ML based query generator 123c can automatically generate block queries based on natural-language, unstructured user prompts. Automatically generating block queries based on natural-language prompts enables a host of technical advantages, including improving the user's ability to interact with the block-based schema, automating repetitive coding tasks, error reduction in automatically-generated queries via obviating the need to type parameters, such as date ranges, and optimization of AI-generated queries.

A "query", as used herein and also sometimes referred to as "code unit", refers to automatically generated computer code that can cause retrieval, from a data store, of specified information or perform other data operations (create, update, delete, change schema, and so forth). Queries can be automatically generated by training neural networks of the AI/ML based query generator 123c to generate queries against the block-based data structures of the platform 100. The automatically generated queries can include SQL queries, XML queries, and/or fuzzy-logic queries. The AI/ML based query generator 123c can structure automatically-generated queries as API calls according to the syntax specified, for example, for API(s) 128. Additionally, the AI/ML based query generator 123c can analyze query patterns and suggest optimizations to improve the efficiency of block-based queries. This can result in faster query execution times and better overall platform performance.

In operation of the platform 100 of FIG. 1, when the method 500 of FIG. 5A is performed, at 502, the AI/ML based query generator 123c of FIG. 1 can receive a set of tokens. The set of tokens can be generated based on a natural-language prompt and can include one or more of the following sets of tokens: context tokens, data source tokens, and/or parameter tokens. Context tokens can enable the AI/ML based query generator 123c to reduce the number of input features to be considered by a the query element generator neural network (e.g., candidate data sources, candidate parameters, further candidate contexts). Data source tokens can enable the AI/ML based query generator 123c to preserve computing resources and forgo selective activation of a neural network that would otherwise generate predictions of data sources based on the contexts. Parameter tokens can enable the AI/ML based query generator 123c to improve the level of accuracy of the generated response by returning data responsive to the natural-language query. Additionally, the use of parameter tokens (e.g., on indexed properties or other indexed data) can improve performance of the modules that generate synthetic items by reducing the number of items in a particular result set. For example, a parameter token that restricts a date range of responsive pages results in a smaller number of responsive pages being included in a result set.

At 504, the AI/ML based query generator 123c of FIG. 1 can vectorize some or all of the received tokens. In some scenarios, these operations can be omitted. Tokens, in their native, as-received or vectorized form, can be compared to block titles 324, identifiers or document templates 364, and/or properties 362 to generate, at 506, sets of candidate data sources, parameters, and/or contexts for the query. For example, a previously generated vectorized representation of a particular one of the block titles 324, identifiers or document templates 364, and/or properties 362 can be compared to a vectorized token to determine a set of likely matches. A likely match can, for example, be indicative of a data source (e.g., page, block, etc.) and/or property to query.

At 508, the AI/ML based query generator 123c of FIG. 1 can generate a set of candidate queries using various combinations of the candidate data sources, tokens and/or parameters. FIGS. 5B-1 and 5B-2 show example queries (550, 570) generated by the AI/ML based query generator 123c, according to some arrangements. A particular query (550, 570) can include various elements. For example, a query can include a query string composed of elements 554-564 and a wrapper string composed of element 552 (as shown, an HTTP method or another API-related element). The wrapper string can be concatenated with the query string to comprise a query.

As shown according to an example, the HTTP method 552 can include HTTP commands (e.g., GET, POST, PUT, HEAD, DELETE, PATCH, OPTIONS, CONNECT, TRACE). In the example shown in FIG. 5B-1, the HTTP method POST is used to send a query to a server (e.g., according to a particular API specification).

An example query (550, 570) can also include a target URL 554, which can include a block identifier and/or a database identifier. A neural network of the AI/ML based query generator 123c can automatically generate a block identifier and/or a database identifier for a query based at least in part on the received tokens. For instance, the tokens extracted or generated based on the user-entered prompt can be used to determine a particular block and/or database where responsive information is likely to reside. For example, the tokens can be compared, in native, as-received or vectorized form, to block titles 324, identifiers or document templates 364, and/or properties 362. In some implementations, the properties 362 can include AI-generated summaries of block content (e.g., using extractive summarization). The AI-generated summaries can be compared, in native, as-received or vectorized form, to the AI-generated summaries, which enables efficient scanning of blocks and determining the block content without scanning the content. An example query (550, 570) can also include configuration information 556. Configuration information can include connection strings, authentication information, output format specifications, and the like.

The example query (550, 570) can also include various automatically generated syntactical elements, such as the filter instruction (558, 578) and/or sort instruction (564, 574). The filter instruction (558, 578) can function similarly to the SQL "WHERE" clause, and the sort instruction (564, 574) can function similarly to the SQL "ORDER BY" clause. For example, the filter instruction (558, 578) can specify a block property (560, 580) to query, where the specification of the block property (560, 580) includes a block property identifier (560d, 580d), an operator (562) and a block property parameter (560e, 580c). In some implementations, the specification of the block property (560, 580) can include an aggregate property 580a and/or a relation 580b. In some implementations, the specification of the block property (560, 580) can include multiple properties, such that the specification of the block property (560, 580) automatically-generated target URL 554 is in a format similar to the following: filter_properties=[property_id_1] &filter_properties=[property_id_2]. The filter instruction (558, 578) and/or sort instruction (564, 574) can be constructed based on the received tokens or generated candidate tokens, such as the context tokens and/or parameter tokens. For instance, a vectorized parameter token can be compared to a set of vectorized properties. The set of vectorized properties can be determined based on the context token. The top candidates (e.g., those meeting a predetermined similarity threshold, such as above a 0.8) can be candidate parameter tokens.

In some scenarios, the generated set of candidate queries can include more than one query. For example, more than one query, relating to different data sources, properties, and so forth may generate result sets that include data in different modalities. For instance, such queries can be generated in response to an example request to generate "documents" involving bears on bicycles, whether those documents (e.g., pages in the block-based data structure) include video, images, and/or text. As described above, the multiple result sets generated (e.g., at 406) by executing multiple queries can be later merged when generating synthetic items (e.g., a count of all responsive items across result sets) and/or when generating a response (e.g., by including citations to different pages that include different types of content).

At 508, the AI/ML based query generator 123c of FIG. 1 can, in some implementations, generate optimizations. For example (e.g., in scenarios where more than one candidate query is predicted to generate a result set), a query quality check can be performed. For instance, the AI/ML based query generator 123c can generate a query optimization estimate and/or select the top-ranking automatically-generated query based on the estimate. For example, if two queries were generated in response to a prompt, the AI/ML based query generator 123c can compute their execution costs (e.g., estimated operation execution times) and/or generate an execution plan for each query. The execution plan can include, for example, the sequence in which source blocks will be accessed, total execution cost for items in the sequence, and/or an indication of whether an index scan (e.g., a property scan) or a content scan will be performed. In some implementations, the AI/ML based query generator 123c can augment the generated estimate of execution costs and execution plans by calculating predictive accuracy scores for the generated queries. In some implementations, predictive accuracy scores can be generated for elements of the generated query (e.g., specification of the block property (560, 580), block property identifier (560d, 580d), operator (562), block property parameter (560e, 580c), filter instruction (558, 578), sort instruction (564, 574)) and aggregated (e.g., summed up, averaged, averaged in a weighted manner where a particular syntax element is assigned a weight). A particular top-ranking automatically-generated query can be selected, for example, based on the predictive accuracy score being the top score and/or being above a predetermined threshold (e.g., 0.8 in a range of 0.0-1.0).

The optimizations can be performed, for example, by a query optimizer neural network and/or an executable file that contains program instructions.

At 510, the AI/ML based query generator 123c of FIG. 1 can generate a subset of candidate queries based on the optimizations. For example, top N queries can be returned for each content modality (e.g., Rich Text Files (RTF), data, tables, images, audio, multimedia) requested in the prompt. Generally, the subset of candidate queries can include one or more queries suitable for execution. The queries can be executed, at 512, (e.g., as database queries, API calls) by the requesting module to generate one or more result sets. The result sets can further be used to generate a response to the natural-language prompt.

One of skill will appreciate that, in some implementations, the input tokens received by the AI/ML based query generator 123c do not originate from a natural-language prompt. For example, the input tokens can be provided to the AI/ML based query generator 123c as part of a training or test data set and/or generated based on training or test data. In various implementations, the AI/ML based query generator 123c can receive the input tokens from, and return output to, the model training engine 123e and/or any of the user applications 102 or AI tools 104 described in relation to FIG. 1. In some implementations, the AI/ML based query generator 123c can invoke the API 128 and return the query along with the result set or forgo returning the query and return the result set.

Figure 6A:
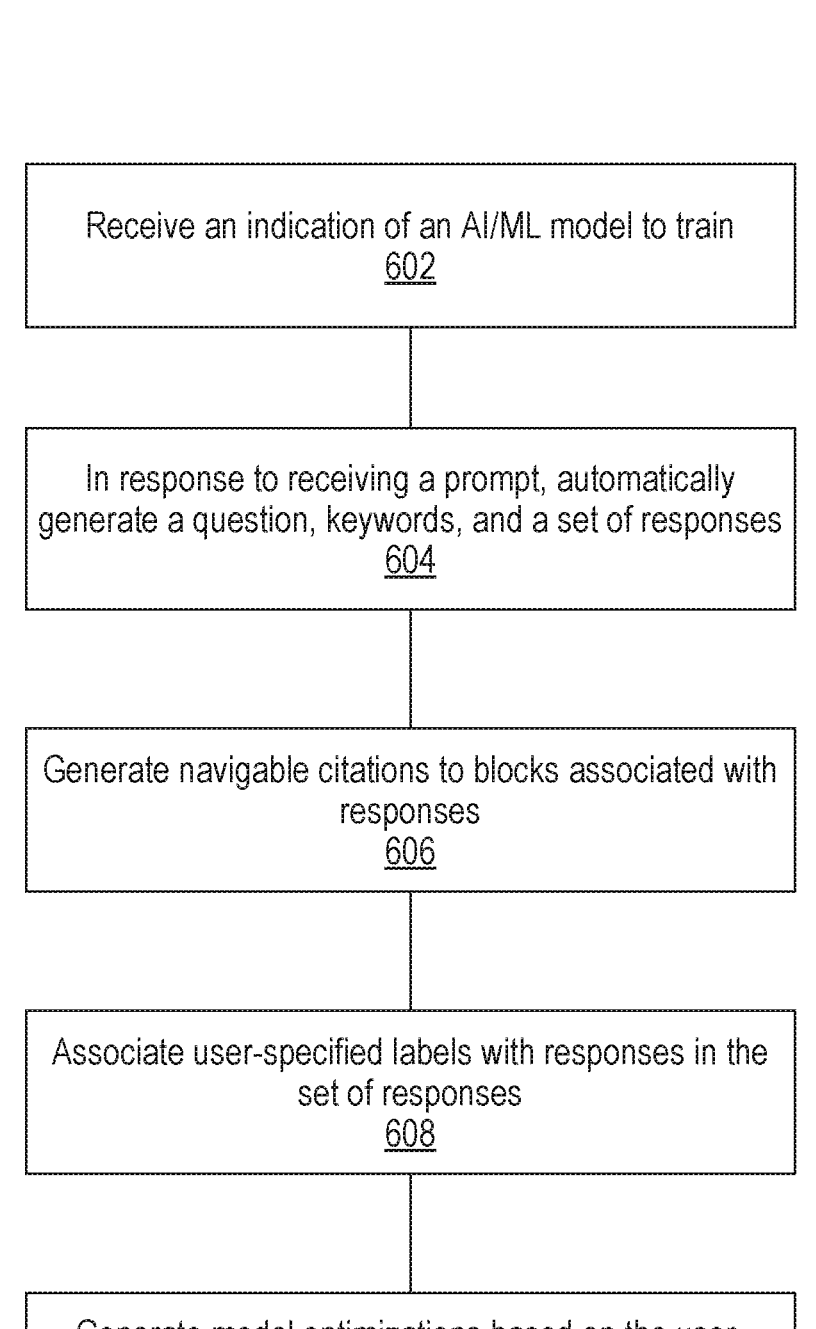
FIG. 6A is a flowchart showing an example method of operation of a model training engine for the Q&A assistant, according to some arrangements.
Figure 6B:
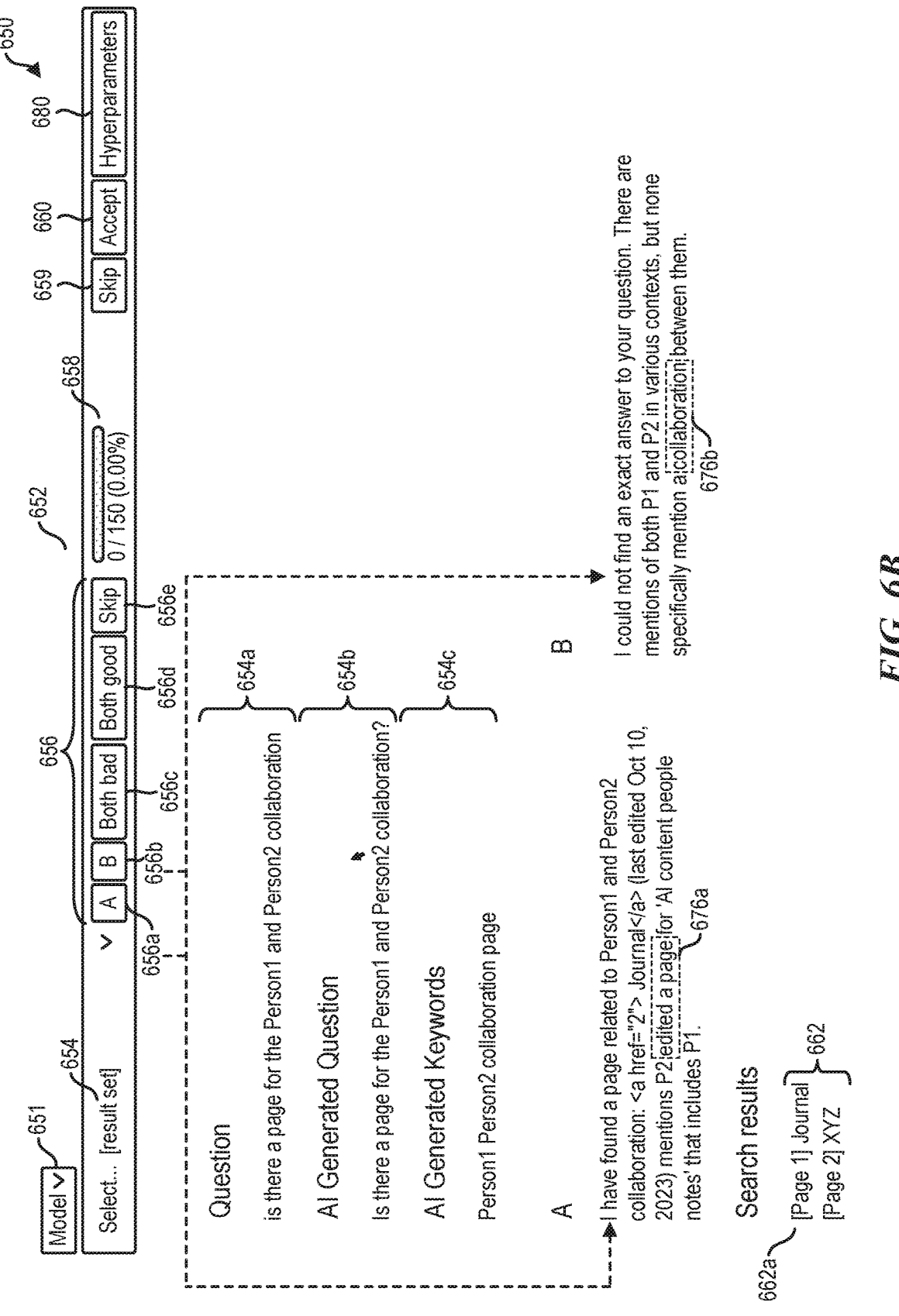
FIG. 6B is an example GUI for the model training engine of the Q&A assistant, according to some arrangements.

Developer Iteration Platform/Model Training Engine for the Machine Learning Based Q&A Assistant FIG. 6A is a flowchart showing an example method 600 of operation of the model training engine 123e, according to some arrangements. FIG. 6B is an example GUI 650 for the model training engine 123e, according to some arrangements. As a general overview, the model training engine 123e provides a UI that enables individuals to train and/or retrain various AI models of the AI tool 104, including, for example, the AI models associated with the Q&A assistant 123a, UI agent 123b, AI/ML based query generator 123c, and/or ranking engine 123d. Enabling individuals (e.g., developers, data engineers, users) to review output of AI/ML models, provide feedback, and/or update data labels enables a host of technical advantages, including ensuring that performance metrics of AI-based models (e.g., accuracy, recall, F-1 score, and so forth) are maximized. Additionally, the model training engine 123e can further enable users to tune various hyperparameters (e.g., learning rate, number of training iterations, batch size, temperature) associated with the underlying models after reviewing the output visualized via the GUI 650. For example, in some implementations, a hyperparameter 680 tuning UI can be accessible from the GUI 650.

The model training engine 123e can be decoupled from the underlying AI model (neural network 125), which can increase cross-portability of the model training engine 123e. For example, in some implementations, the GUI 650 can include a model selection control 651, which can enable the user to select a particular model (e.g., a particular version or instance of the transformer or another LLM or neural network, or, more generally, any suitable neural network 125, such as a prompt tokenizer neural network, response generator neural network, query element generator neural network, query generator neural network, and/or query optimizer neural network). The model 651 selection control can be bound to the result set 654 selection control.

In some implementations, distinct instances or variants of the GUI 650 and corresponding instances of the model training engine 123e can exist, such that a particular variant of the GUI 650 is bound to a particular neural network 125 (e.g., prompt tokenizer neural network, response generator neural network, query element generator neural network, query generator neural network, and/or query optimizer neural network).

The example below relates to a variant of the GUI 650 used for training a particular variant of the neural network 125 of the AI tool 104, the response generator neural network. In operation of the platform 100 of FIG. 1, when the method 600 of FIG. 6A is performed, at 602, the model training engine 123e can receive (e.g., via the model selection control 651 or implicitly by recognizing a binding of the GUI 650 to a particular neural network 125) an indication of the neural network 125 to train.

At 604, the neural network 125 can receive a prompt 654a as an input. The neural network can generate question 654b, keywords 654c, and response options (656a, 656b) using the input. One of skill will appreciate, however, that the neural network 125 (here, the response generator neural network) can be a downstream neural network relative to other components of the Q&A assistant 123a, including other neural networks 125. For example, the response generator neural network can be invoked by the Q&A assistant 123a after the Q&A assistant 123a has performed various processing tasks described herein. Accordingly, the response generator neural network can receive, for example, tokens (e.g., keywords 654c) previously generated by any of the tokenizer neural network, query element generator neural network, query generator neural network, and/or query optimizer neural network. For example, the response generator neural network can receive, rather than generate, query results and can generate the response options (656a, 656b) using the received query results.

At 606, the platform can generate navigable citations to responsive blocks 662 in the block-based data structure. The responsive blocks 662 can be specific to a particular one of the response options (656a, 656b). The particular responsive blocks 662 included in a particular one of the response options (656a, 656b) can be determined by a temperature hyperparameter 680 associated with the model. Temperature hyperparameter value (e.g., in the range of 0.0 to 1.0) can control how creative a particular model is. For example, a comparatively lower temperature value will make the model more deterministic, causing it to generate response option 656b ("I could not find an exact answer to your question. There are mentions of both P1 and P2 in various contexts, but none specifically mention a collaboration between them.") In other words, the comparatively lower temperature value (e.g., under 0.3) can cause the model to look specifically for a page that mentions a keyword 676b ("collaboration"). On the other hand, a comparatively higher temperature value will make the model less deterministic and more creative, causing it to generate response option 656a ("I have found a page related to P1 and P2 collaboration: [a particular page] mentions P2 edited a page . . . that includes P1.") In other words, the comparatively higher temperature value (e.g., over 0.7) can cause the model to forgo looking for a specific keyword 654c (e.g., "collaboration") and/or additionally look for other evidence of collaboration (e.g., an indication, such as an indication via a property, that a particular individual edited a page (676a) created by another individual).

At 608, the platform can enable the user to associate labels (656a-d) with response options (656a, 656b). The labels can be binary and/or categorical labels that evaluate the quality of response options (656a, 656b). For example, the user can indicate that response option 656a is good, response option 656b is good, both response options (656a, 656b) are bad (656c), or both response options (656a, 656b) are good (656d). The user can also skip (656e) response options. The indicator bar 658 can show the user's progress in evaluating and labeling items in the result set 654. The user can also skip (659) or accept (660) a particular result set 654. In some implementations, the labels can be generated by an AI model (e.g., another neural network).

At 610, the platform can generate model optimizations based on the labels. In some implementations, a particular model will use the labels to automatically adjust its internal parameters (e.g., weights). For example, in response to a user indicating that the less deterministic response option 656a is good, the model can learn to give a comparatively greater weight to information about particular structural characteristics of the block-based data model. For instance, the model can learn to give comparatively greater weight to a particular property of a page (e.g., "last_edited_by"). More generally, the model can learn to adjust the relative importance and/or weights of structural characteristics that relate to context tokens, block types, block dependencies, block content values, block content types, and/or block formats.

In some implementations, generating optimizations can include generating recommended ranges for hyperparameters based on the data. For example, if trainer feedback indicates that a more deterministic response option is preferred, the platform can compute a numerical adjustment value to a current hyperparameter value. In some implementations, the adjustment value can include steps, such as 0.01, 0.05, 0.1, and so forth. In some implementations, the desired steps can be pre-set by the trainer. In some implementations, the desired steps can be automatically determined using, for example, a reference table. In some implementations, the desired steps can be determined based on how far along a particular model is in the training process (e.g., by considering the number of completed training iterations, records processed, questions answered, and so forth). For example, comparatively new models (e.g., those that have performed under N training iterations) can be configured to use larger step values (e.g., more aggressively adjust the temperature or another parameter or hyperparameter), and more established models (e.g., those that have performed at least N*10 training iterations) can be configured to use smaller step values to more granularly control the parameter/hyperparameter values.

Result Set Ranking Engine for the Machine Learning Based Q&A Assistant

Figure 7:
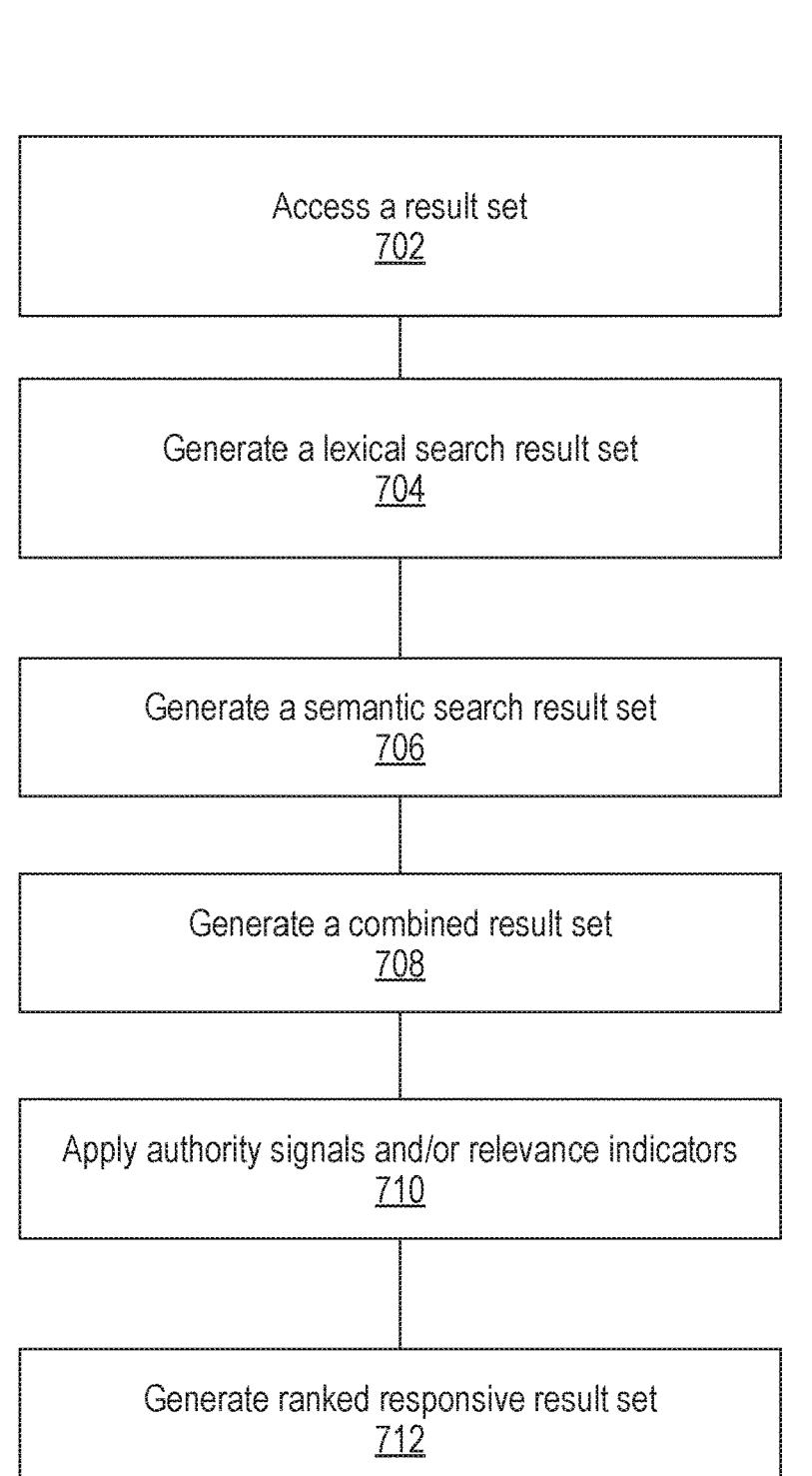
FIG. 7 is a flowchart showing an example method of operation of a ranking engine for the Q&A assistant, according to some arrangements.

FIG. 7 is a flowchart showing an example method 700 of operation of the ranking engine 123d for the Q&A assistant 123a of FIG. 1, according to some arrangements. For example, the ranking engine 123d can filter and/or order items in a particular result set, such as the result set generated at step 406 of FIG. 4A, based on relevance to a particular user, a document authority indicator, a similarity indicator, and so forth. In some implementations, the operations of the ranking engine 123d can be performed as part of various operation blocks described herein (e.g., as part of or in place of operations 404, 406, 408, 408, 410, 506, 508, 510).

Enabling smart result set filtering includes a host of technical advantages, such as improving the relevance of AI-generated output to a particular requestor, improving the quality of AI-generated output, accommodating the limitations of systems with small screens (e.g., mobile devices) by displaying certain results on top of a result set, and improving security of data by taking into account user permissions. Furthermore, the platform can enable user-specified filtering via query and/or via user-editable filtering controls (e.g., enabling the user to specify data source(s) to search, author(s) to search, etc.).

In operation of the platform 100 of FIG. 1, when the method 700 of FIG. 7 is performed, at 702, the ranking engine 123d can receive or access a result set. The result set can include, for example, a block (and/or a set of linked blocks) and its corresponding property identifiers, metadata, and/or content. The result set can be generated, for example, by executing one or more of AI-generated queries against AI-determined data source(s) in response to receiving a natural-language prompt.

At 704, the ranking engine 123d can execute lexical indexing/matching operations on items in the result set. For example, an elastic search, lexical search, or the like can be performed on items in the result set(s) to retrieve data that matches keywords. For example, in response to a prompt "what's our policy on processing refunds?", a previously-generated query may have returned a set of blocks or pages that include a title "refund". The ranking engine 123d can search the content of the pages for the keyword "refund" or additional keywords (e.g., by referencing an ontology to determine synonyms and/or context terms).

At 706, the ranking engine 123d can execute semantic indexing/matching operations on items in the result set. For example, in response to a prompt "what's our policy on processing refunds?", a previously-generated query may have returned a set of blocks or pages that include a title "refund". The ranking engine 123d can compare vectorized content of the pages to vectorized items that represent the concept of "refund". Furthermore, the system can consider contextual items (e.g., the term "policy") to prioritize certain pages (e.g., those that mention "refund policy") and deprioritize pages where the "term" refund is not mentioned in the context of "refund policy".

In some implementations, the operations 704 and/or 706 can be performed on items other than content. For example, the operations 704 and/or 706 can be performed on values of properties included in a result set. For example, in response to a prompt "what's our policy on processing refunds?", a previously-generated query may have returned a set of blocks or pages that include a property "policy document" or a tag collection. The ranking engine 123d can compare property or tag values or vectorized property or tag values to the string "refund policy", its synonyms, and/or vectorized representation(s) of these strings or synonyms.

One of skill will appreciate that one or both of operations 704 and 706 can be performed on a particular result set. If both operations are performed, then, at 708, the ranking engine 123d can generate a combined result set (e.g., an intersection of result sets, an intersection of result sets as well as top N remaining items from each result set, a union of result sets) that includes items from both the lexical search result set and semantic search result set. One of skill will appreciate that operations that follow can be performed on any of the lexical search result set, semantic search result set, and/or the combined result set.

At 710, the ranking engine 123d can generate or retrieve authority signals for items in the result set and apply the authority signals to rank or rerank items in the result set. Authority signals can be generated in substantially real-time or previously computed. Examples of authority signals can include numerical scores (e.g., in a range of 0.0-10.0, 0.0-100.0) computed based on how many times a particular content item (e.g., block, page, template, database) has been viewed in a particular time period (e.g., the relevant recency period specified by the query, since inception, since last update of the block). As an additional example, authority signals can be computed based on a count of unique users (accounts, IP addresses, MAC addresses) accessed a particular block or page. As an additional example, authority signals can be computed or adjusted based on relative recency of a particular item. For example, recency ranges (0-2 days, 2-7 days, 7-30 days, older than 30 days) can be assigned corresponding weights (0.7, 0.5, 0.3, 0.1).

In some implementations, authority signals can be utilized by the platform to generate, and assign to items in a result set, relevance indicators. For example, records in a particular result set can be labeled (e.g., based on authority signal values, scaled authority signal values, weighted authority signal values) as "relevant", "potentially relevant", or "not relevant".

In some implementations, the operations at 710 can be performed by a first neural network, such as the neural network 125, which can be a classification model. For example, the neural network can accept, as an input feature set, a combined result set along with authority signals and return the result set records and/or labels along with their categorical relevance indicators.

At 712, the output of the first neural network can serve as an input feature map for a second neural network. The second neural network can remove non-responsive items from the result set and generate a responsive result set. Advantageously, using two comparatively smaller neural networks sequentially can optimize and reduce the amount of required processing resources (e.g., memory, processor) because smaller feature sets can significantly reduce complexity (e.g., number of layers, number of nodes) in the respective neural networks. Additionally, utilization of separately-trained, smaller neural networks can minimize occurrences of over-fitting and/or hallucinations, which can otherwise occur if the models are initially trained on incomplete data or, more generally, as models lose predictive accuracy because of changes in data and use cases over time. However, one of skill will appreciate that, in some implementations, the operations of the first neural network and the second neural network can be combined and/or can be carried out by a differently-structured computer program, AI model or framework.

Items in the responsive result set can be ranked based on the authority signal and/or relevance signal. Additionally, items in the responsive result set can be further filtered based on user access permissions. The items can be appended to include hyperlinks to citations, which can be visualized via a GUI and enable users to review the source blocks/pages while continuing to interact with the Q&A assistant.

Computer System

Figure 8:
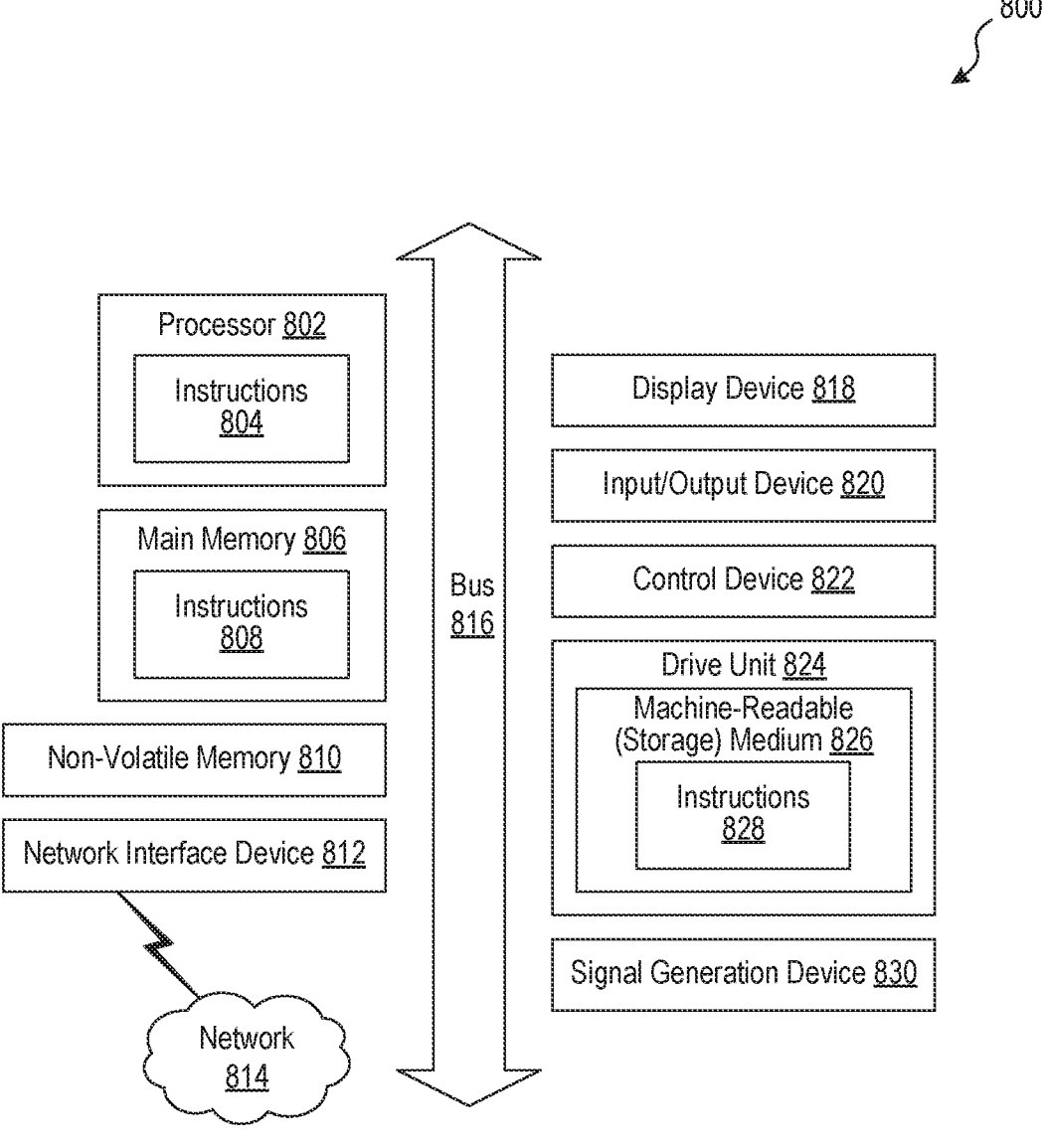
FIG. 8 is a block diagram that illustrates an example of a computer system in which at least some operations described herein can be implemented.

FIG. 8 is a block diagram that illustrates an example of a computer system 800 in which at least some operations described herein can be implemented. As shown, the computer system 800 can include: one or more processors 802, main memory 806, non-volatile memory 810, a network interface device 812, a display device 818, an input/output device 820, a control device 822 (e.g., keyboard and pointing device), a drive unit 824 that includes a machine readable (storage) medium 826, and a signal generation device 830 that are communicatively connected to a bus 816. The bus 816 represents one or more physical buses and/or point-to-point connections that are connected by appropriate bridges, adapters, or controllers. Various common components (e.g., cache memory) are omitted from FIG. 8 for brevity. Instead, the computer system 800 is intended to illustrate a hardware device on which components illustrated or described relative to the examples of the figures and any other components described in this specification can be implemented.

The computer system 800 can take any suitable physical form. For example, the computer system 800 can share a similar architecture as that of a server computer, personal computer (PC), tablet computer, mobile telephone, wearable electronic device, network-connected ("smart") device (e.g., a television or home assistant device), AR/VR system (e.g., head-mounted display), or any electronic device capable of executing a set of instructions that specify action(s) to be taken by the computer system 800. In some implementations, the computer system 800 can be an embedded computer system, a system-on-chip (SOC), a single-board computer (SBC) system, or a distributed system such as a mesh of computer systems or include one or more cloud components in one or more networks. Where appropriate, one or more computer systems 800 can perform operations in real time, near real time, or in batch mode.

The network interface device 812 enables the computer system 800 to mediate data in a network 814 with an entity that is external to the computer system 800 through any communication protocol supported by the computer system 800 and the external entity. Examples of the network interface device 812 include a network adapter card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 806, non-volatile memory 810, machine-readable medium 826) can be local, remote, or distributed. Although shown as a single medium, the machine-readable medium 826 can include multiple media (e.g., a centralized/distributed database and/or associated caches and servers) that store one or more sets of instructions 828. The machine-readable medium 826 can include any medium that is capable of storing, encoding, or carrying a set of instructions for execution by the computer system 800. The machine-readable medium 826 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 810, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 804, 808, 828) set at various times in various memory and storage devices in computing device(s). When read and executed by the processor 802, the instruction(s) cause the computer system 800 to perform operations to execute elements involving the various aspects of the disclosure.

REMARKS

The terms "example," "embodiment," and "implementation" are used interchangeably. For example, references to "one example" or "an example" in the disclosure can be, but not necessarily are, references to the same implementation;

and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the Detailed Description above using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the Detailed Description above explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

The invention claimed is:

1. One or more non-transitory, computer-readable storage media comprising instructions recorded thereon, wherein the instructions, when executed by at least one data processor of a computing system, cause the computing system to:

capture, via an input control of a graphical user interface (GUI) associated with a question and answer (Q&A) assistant engine for a multimodal content management system having a block-based data structure, a natural language prompt;

tokenize the natural language prompt to generate a set of data source tokens and a set of parameter tokens,
wherein a parameter token in the set of parameter tokens is indicative of a block property in the block-based data structure;

using the set of data source tokens and the set of parameter tokens, execute a trained neural network to generate a query structured to operate on the block-based data structure;

cause the generated query to be executed against the block-based data structure to generate a result set; and using the result set, generate and display, via the GUI, a visualization comprising a result set item, by:
generating a navigable citation relating to a result set item in the result set;
generating a narrative comprising the navigable citation; and
while displaying the input control to accept a second natural language prompt, and responsive to detecting a user interaction with the navigable citation, causing the GUI to display content of a block in the block-based data structure, wherein the block corresponds to the result set item.

2. The media of claim 1, wherein the instructions, when executed by the at least one data processor of the computing system, cause the computing system to generate the query structured to operate on the block-based data structure of the multimodal content management system by performing operations to:

generate a first vectorized item relating to a block content, a block identifier, or a block property of a particular stored item in the block-based data structure;

generate a second vectorized item relating to at least one of a data source token in the set of data source tokens or the parameter token;

based on a determination that the first vectorized item and the second vectorized item meet a similarity threshold, generate a query segment that references the block content, the block identifier, or the block property of the particular stored item in the block-based data structure; and include the query segment in the query.

3. The media of claim 1, wherein a parameter token in the set of parameter tokens generated based on the natural language prompt is indicative of a block property that comprises an artificial intelligence (AI)-generated item.

4. The media of claim 1, wherein a parameter token in the set of parameter tokens generated based on the natural language prompt is indicative of a block property that comprises at least one of: a tag relating to block content, a date, a time stamp, text, numerical information, an email address, a phone number, a formula, a roll-up, permission information, a user identifier, a file, a media item, a URL, or a link to an external source of content to query.

5. The media of claim 1, wherein the navigable citation is a first navigable citation, the result set item is a first result set item, and the user interaction is a first user interaction, and wherein the instructions, when executed by the at least one data processor of the computing system, cause the computing system to generate the visualization by performing operations to:

generate a second navigable citation relating to a second result set item; include the second navigable citation in the narrative; and responsive to detecting a second user interaction with the second navigable citation, cause the GUI to display second content of a second corresponding block in the block-based data structure.

6. The media of claim 5, wherein the first result set item is in a first content modality and the second result set item is in a second content modality different from the first content modality, and wherein the first content modality or the second content modality comprise one or more of text, data, a table, an image, an audio item, a video item, a multimedia item, and a digital map.

7. The media of claim 1, wherein the instructions, when executed by the at least one data processor of the computing system, cause the computing system to generate and include in the visualization a synthetic item based on an item in the result set.

8. A computer-implemented method, the method comprising:

capturing, via an input control of a graphical user interface (GUI) associated with a question and answer (Q&A) assistant engine for a multimodal content management system having a block-based data structure, a natural language prompt;

tokenizing the natural language prompt to generate a set of data source tokens and a set of parameter tokens, wherein a parameter token in the set of parameter tokens is indicative of a block property in the block-based data structure;

using the set of data source tokens and the set of parameter tokens, executing a trained neural network to generate a query structured to operate on the block-based data structure;

causing the generated query to be executed against the block-based data structure to generate a result set; and using the result set, generating and displaying, via the GUI, a visualization comprising a result set item, by:

generating a navigable citation relating to a result set item in the result set;

generating a narrative comprising the navigable citation; and while displaying the input control to accept a second natural language prompt, and responsive to detecting a user interaction with the navigable citation, causing the GUI to display content of a block in the block-based data structure, wherein the block corresponds to the result set item.

9. The method of claim 8, further comprising:

generating a first vectorized item relating to a block content, a block identifier, or a block property of a particular stored item in the block-based data structure;

generating a second vectorized item relating to at least one of a data source token in the set of data source tokens or the parameter token;

based on a determination that the first vectorized item and the second vectorized item meet a similarity threshold, generating a query segment that references the block content, the block identifier, or the block property of the particular stored item in the block-based data structure; and including the query segment in the query.

10. The method of claim 8, wherein a parameter token in the set of parameter tokens generated based on the natural language prompt is indicative of a block property that comprises an artificial intelligence (AI)-generated item.

11. The method of claim 8, wherein a parameter token in the set of parameter tokens generated based on the natural language prompt is indicative of a block property that comprises at least one of: a tag relating to block content, a date, a time stamp, text, numerical information, an email address, a phone number, a formula, a roll-up, permission information, a user identifier, a file, a media item, a URL, or an external source of content to query.

12. The method of claim 8, wherein the navigable citation is a first navigable citation, the result set item is a first result set item, and the user interaction is a first user interaction, the method further comprising:

generating a second navigable citation relating to a second result set item;

including the second navigable citation in the narrative; and responsive to detecting a second user interaction with the second navigable citation, causing the GUI to display second content of a second corresponding block in the block-based data structure.

13. The method of claim 12, wherein the first result set item is in a first content modality and the second result set item is in a second content modality different from the first content modality, and wherein the first content modality or the second content modality comprise one or more of text, data, a table, an image, an audio item, a video item, a multimedia item, and a digital map.

14. The method of claim 8, further comprising generating and including in the visualization a synthetic item based on an item in the result set.

15. A computing system comprising at least one data processor and one or more non-transitory, computer-readable storage media comprising instructions recorded thereon, wherein the instructions, when executed by the at least one data processor, cause the computing system to:

capture, via an input control of a graphical user interface (GUI) associated with a question and answer (Q&A) assistant engine for a multimodal content management system having a block-based data structure, a natural language prompt;

tokenize the natural language prompt to generate a set of data source tokens and a set of parameter tokens, wherein a parameter token in the set of parameter tokens is indicative of a block property in the block-based data structure;

using the set of data source tokens and the set of parameter tokens, execute a trained neural network to generate a query structured to operate on the block-based data structure;

cause the generated query to be executed against the block-based data structure to generate a result set; and using the result set, generate and display, via the GUI, a visualization comprising a result set item, by:

generating a navigable citation relating to a result set item in the result set;

generating a narrative comprising the navigable citation; and while displaying the input control to accept a second natural language prompt, and responsive to detecting a user interaction with the navigable citation, causing the GUI to display content of a block in the block-based data structure, wherein the block corresponds to the result set item.

16. The computing system of claim 15, wherein the instructions, when executed by the at least one data processor of the computing system, cause the computing system to generate the query structured to operate on the block-based data structure of the multimodal content management system by performing operations to:

generate a first vectorized item relating to a block content, a block identifier, or a block property of a particular stored item in the block-based data structure;

generate a second vectorized item relating to at least one of a data source token in the set of data source tokens or the parameter token;

based on a determination that the first vectorized item and the second vectorized item meet a similarity threshold, generate a query segment that references the block content, the block identifier, or the block property of the particular stored item in the block-based data structure; and include the query segment in the query.

17. The computing system of claim 15, wherein a parameter token in the set of parameter tokens generated based on the natural language prompt is indicative of a block property that comprises an artificial intelligence (AI)-generated item.

18. The computing system of claim 15, wherein a parameter token in the set of parameter tokens generated based on the natural language prompt is indicative of a block property that comprises at least one of: a tag relating to block content, a date, a time stamp, text, numerical information, an email address, a phone number, a formula, a roll-up, permission information, a user identifier, a file, a media item, a URL, or an external source of content to query.

19. The computing system of claim 15, wherein the navigable citation is a first navigable citation, the result set item is a first result set item, and the user interaction is a first user interaction, and wherein the instructions, when executed by the at least one data processor of the computing system, cause the computing system to generate the visualization by performing operations to:

generate a second navigable citation relating to a second result set item;

include the second navigable citation in the narrative; and responsive to detecting a second user interaction with the second navigable citation, cause the GUI to display second content of a second corresponding block in the block-based data structure.

20. The computing system of claim 19, wherein the first result set item is in a first content modality and the second result set item is in a second content modality different from the first content modality, and wherein the first content modality or the second content modality comprise one or more of text, data, a table, an image, an audio item, a video item, a multimedia item, and a digital map.

* * * * *